(12) United States Patent
Hurwitz et al.

(10) Patent No.: US 8,406,239 B2
(45) Date of Patent: Mar. 26, 2013

(54) MULTI-WIDEBAND COMMUNICATIONS OVER MULTIPLE MEDIUMS

(75) Inventors: Jonathan Ephraim David Hurwitz, Edinburgh (GB); Juan Carlos Riveiro, Barcelona (ES); David Ruiz, Barcelona (ES)

(73) Assignee: Broadcom Corporation, Irvine, CA (US)

( * ) Notice: Subject to any disclaimer, the term of this patent is extended or adjusted under 35 U.S.C. 154(b) by 1095 days.

(21) Appl. No.: 11/752,887

(22) Filed: May 23, 2007

(65) Prior Publication Data

US 2008/0130640 A1 Jun. 5, 2008

Related U.S. Application Data

(63) Continuation-in-part of application No. 11/536,539, filed on Sep. 28, 2006, and a continuation-in-part of application No. 11/562,380, filed on Nov. 21, 2006, and a continuation-in-part of application No. 11/619,167, filed on Jan. 2, 2007.

(30) Foreign Application Priority Data

Oct. 3, 2005 (EP) ..................................... 05256179

(51) Int. Cl.
*H04L 12/28* (2006.01)
(52) U.S. Cl. ........ 370/401; 370/318; 370/538; 370/466; 375/312; 375/349; 375/288; 375/257; 340/12.32; 340/13.23; 340/568.2; 340/568.3; 340/538; 340/288
(58) Field of Classification Search .................. 370/389, 370/93.01, 318, 538, 466; 375/257, 312, 375/349, 288; 340/310.11, 12.32, 13.23, 340/568.2, 568.3, 538
See application file for complete search history.

(56) References Cited

U.S. PATENT DOCUMENTS

| 3,379,973 A | 4/1968 | Walton |
| 3,445,763 A | 5/1969 | Harris, Jr. |

(Continued)

FOREIGN PATENT DOCUMENTS

| EP | 0 580 457 A1 | 1/1994 |
| EP | 0580457 A1 | 1/1994 |

(Continued)

OTHER PUBLICATIONS

U.S. Appl. No. 12/144,511, Hurwitz, Dual Transformer Communication Interface, filed Jun. 23, 2008.

(Continued)

*Primary Examiner* — Kamran Afshar
*Assistant Examiner* — Khalid Shaheed
(74) *Attorney, Agent, or Firm* — Garlick & Markison; Holly L. Rudnick

(57) ABSTRACT

A powerline communications device comprises a powerline communications interface and at least one other communications interface configured to communicate over a computing network. The powerline communications interface is further configured to receive electrical power. The computing network may comprise mediums including powerlines, telephone lines, and/or coaxial cables. In some embodiments, the powerline communications interface may communicate with a network apparatus, such as a personal computer, via an Ethernet interface. The powerline interface, the telephone line interface, and/or the coaxial cable interface may all be associated with the same media access control (MAC) address. The powerline communications device may receive a message via a first medium and repeat the message via a second medium based on a quality of service (QoS) metric. In some embodiments, the powerline communications device may communicate using multiple frequency bands.

21 Claims, 15 Drawing Sheets

U.S. PATENT DOCUMENTS

| | | | |
|---|---|---|---|
| 4,096,361 A | 6/1978 | Crawford | |
| 4,224,483 A | 9/1980 | Neigh et al. | |
| 4,430,731 A * | 2/1984 | Gimple et al. | 725/131 |
| 4,636,711 A | 1/1987 | Freymuth | |
| 4,636,771 A | 1/1987 | Ochs | |
| 4,772,870 A | 9/1988 | Reyes | |
| 4,922,534 A | 5/1990 | Gorniak et al. | |
| 5,287,065 A | 2/1994 | Allfather | |
| 5,574,748 A | 11/1996 | Vander Mey et al. | |
| 5,732,223 A | 3/1998 | Moore et al. | |
| 5,777,544 A | 7/1998 | Vander Mey et al. | |
| 5,880,631 A | 3/1999 | Sahota | |
| 5,929,750 A | 7/1999 | Brown | |
| 5,929,896 A | 7/1999 | Goodman et al. | |
| 5,933,071 A | 8/1999 | Brown | |
| 5,978,371 A | 11/1999 | Mason et al. | |
| 6,014,386 A | 1/2000 | Abraham | |
| 6,151,480 A * | 11/2000 | Fischer et al. | 340/310.12 |
| 6,215,987 B1 | 4/2001 | Fujita | |
| 6,243,413 B1 | 6/2001 | Beukema | |
| 6,353,628 B1 | 3/2002 | Wallace et al. | |
| 6,373,377 B1 | 4/2002 | Sacca et al. | |
| 6,407,987 B1 | 6/2002 | Abraham | |
| 6,411,163 B1 | 6/2002 | Enriquez | |
| 6,518,839 B2 | 2/2003 | Gibson et al. | |
| 6,593,868 B2 | 7/2003 | Clara et al. | |
| 6,888,485 B2 | 5/2005 | Splett et al. | |
| 6,957,086 B2 | 10/2005 | Bahl et al. | |
| 6,985,715 B2 | 1/2006 | Lee | |
| 6,998,962 B2 * | 2/2006 | Cope et al. | 370/351 |
| 7,005,943 B2 * | 2/2006 | Cern | 333/175 |
| 7,042,351 B2 | 5/2006 | Kline | |
| 7,053,756 B2 | 5/2006 | Mollenkopf et al. | |
| 7,075,414 B2 | 7/2006 | Giannini et al. | |
| 7,079,537 B1 | 7/2006 | Kanuri et al. | |
| 7,221,196 B2 | 5/2007 | Shirani | |
| 7,224,272 B2 * | 5/2007 | White et al. | 340/538 |
| 7,248,148 B2 | 7/2007 | Kline et al. | |
| 7,269,403 B1 | 9/2007 | Miao | |
| 7,286,026 B2 * | 10/2007 | Law | 333/124 |
| 7,330,143 B2 | 2/2008 | Kim et al. | |
| 7,391,317 B2 | 6/2008 | Abraham et al. | |
| 7,457,885 B2 * | 11/2008 | Chan et al. | 709/250 |
| 7,602,220 B1 | 10/2009 | Bofill-Petit et al. | |
| 7,626,489 B2 * | 12/2009 | Berkman et al. | 340/310.11 |
| 7,725,096 B2 | 5/2010 | Riveiro et al. | |
| 2001/0053207 A1 * | 12/2001 | Jeon et al. | 379/90.01 |
| 2002/0010870 A1 | 1/2002 | Gardner | |
| 2002/0026528 A1 | 2/2002 | Lo | |
| 2002/0145996 A1 | 10/2002 | Robinson et al. | |
| 2002/0154000 A1 | 10/2002 | Kline | |
| 2002/0174423 A1 * | 11/2002 | Fifield et al. | 725/1 |
| 2002/0181437 A1 | 12/2002 | Ohkubo et al. | |
| 2003/0016123 A1 | 1/2003 | Tager et al. | |
| 2003/0062990 A1 * | 4/2003 | Schaeffer et al. | 340/310.01 |
| 2003/0114153 A1 | 6/2003 | Shaver et al. | |
| 2003/0129978 A1 * | 7/2003 | Akiyama et al. | 455/426 |
| 2003/0133473 A1 | 7/2003 | Manis et al. | |
| 2003/0169155 A1 | 9/2003 | Mollenkopf et al. | |
| 2003/0184433 A1 | 10/2003 | Zalitzky et al. | |
| 2003/0203721 A1 | 10/2003 | Berezdivin et al. | |
| 2003/0224728 A1 | 12/2003 | Heinonen et al. | |
| 2004/0003338 A1 | 1/2004 | Kostoff et al. | |
| 2004/0022304 A1 | 2/2004 | Santhoff et al. | |
| 2004/0032320 A1 | 2/2004 | Zalitzky et al. | |
| 2004/0047427 A1 | 3/2004 | Dostert et al. | |
| 2004/0056734 A1 | 3/2004 | Davidow | |
| 2004/0077353 A1 * | 4/2004 | Mahany | 455/448 |
| 2004/0107588 A1 | 6/2004 | Pu | |
| 2004/0113756 A1 | 6/2004 | Mollenkopf | |
| 2004/0113757 A1 | 6/2004 | White, II et al. | |
| 2004/0174851 A1 | 9/2004 | Zalitzky et al. | |
| 2004/0213237 A1 | 10/2004 | Yasue et al. | |
| 2004/0220766 A1 | 11/2004 | Harbord et al. | |
| 2004/0246107 A1 | 12/2004 | Kline | |
| 2005/0018668 A1 | 1/2005 | Cheriton | |
| 2005/0020227 A1 | 1/2005 | Kumigawa et al. | |
| 2005/0031047 A1 | 2/2005 | Maltsev et al. | |
| 2005/0089061 A1 | 4/2005 | Logvinov et al. | |
| 2005/0094647 A1 | 5/2005 | Hata et al. | |
| 2005/0141473 A1 | 6/2005 | Lim et al. | |
| 2005/0143973 A1 | 6/2005 | Taniguchi et al. | |
| 2005/0157670 A1 | 7/2005 | Tang et al. | |
| 2005/0169056 A1 * | 8/2005 | Berkman et al. | 365/185.22 |
| 2005/0174950 A1 | 8/2005 | Ayyagari | |
| 2005/0190826 A1 | 9/2005 | Van Bruyssel et al. | |
| 2005/0213874 A1 * | 9/2005 | Kline | 385/15 |
| 2005/0249245 A1 | 11/2005 | Hazani et al. | |
| 2006/0038662 A1 | 2/2006 | White, II et al. | |
| 2006/0045066 A1 | 3/2006 | Choi et al. | |
| 2006/0097573 A1 * | 5/2006 | Gidge et al. | 307/3 |
| 2006/0097574 A1 | 5/2006 | Gidge et al. | |
| 2006/0106961 A1 | 5/2006 | Ebata et al. | |
| 2006/0120399 A1 | 6/2006 | Claret et al. | |
| 2006/0126617 A1 | 6/2006 | Cregg et al. | |
| 2006/0146866 A1 | 7/2006 | Horvath et al. | |
| 2006/0176898 A1 | 8/2006 | Chan et al. | |
| 2006/0291575 A1 | 12/2006 | Berkman et al. | |
| 2007/0002771 A1 | 1/2007 | Berkman et al. | |
| 2007/0008972 A1 | 1/2007 | Sifnatsch et al. | |
| 2007/0025386 A1 | 2/2007 | Riedel et al. | |
| 2007/0060151 A1 | 3/2007 | Lee | |
| 2007/0076595 A1 | 4/2007 | Lee et al. | |
| 2007/0268124 A1 * | 11/2007 | Berkman | 340/538 |
| 2008/0001801 A1 | 1/2008 | Nhuyen | |
| 2009/0022175 A1 * | 1/2009 | Logvinov et al. | 370/463 |
| 2009/0128386 A1 | 5/2009 | Meynants et al. | |

FOREIGN PATENT DOCUMENTS

| | | |
|---|---|---|
| EP | 1 134 909 A1 | 9/2001 |
| EP | 1134909 A1 | 9/2001 |
| EP | 1 351 408 A1 | 10/2003 |
| EP | 1351408 B1 | 10/2003 |
| EP | 1388954 A2 | 2/2004 |
| EP | 1 432 138 A1 | 6/2004 |
| EP | 1531568 A1 | 5/2005 |
| EP | 1548974 A2 | 6/2005 |
| EP | 1432138 B1 | 9/2005 |
| WO | 0195518 A2 | 12/2001 |
| WO | WO 01/95518 | 12/2001 |
| WO | 03015291 A2 | 2/2003 |
| WO | WO 03/015291 A2 | 2/2003 |
| WO | 03077443 A1 | 9/2003 |
| WO | 03092212 A1 | 11/2003 |
| WO | 2004100392 A1 | 11/2004 |
| WO | WO 2004/100392 | 11/2004 |
| WO | 2005039070 A2 | 4/2005 |
| WO | 2006017743 A2 | 2/2006 |
| WO | 2006074174 A1 | 7/2006 |

OTHER PUBLICATIONS

U.S. Appl. No. 12/145,475, Bonfill-Petit, Resistor—Input Transconductor Including Common-Mode Compensation, filed Jun. 24, 2008.

U.S. Appl. No. 12/493,292, Hurwitz, Feedback Impedance Control for Driving a Signal, filed Jul. 25, 2006.

U.S. Appl. No. 12/075,888, Hurwitz, Coupling Signal Processing Circuitry with a Wireline Communications Medium, filed Mar. 14, 2008.

U.S. Appl. No. 11/752,887, Hurwitz, Multi-Wideband Communications Over Multiple Mediums, filed May 23, 2007.

U.S. Appl. No. 11/752,865, Hurwitz, Multi-Wideband Communications Over Multiple Mediums within a Network, filed May 23, 2007.

U.S. Appl. No. 11/482,373, Molina, Adaptive Multi-Carrier Code Division Multiple Access, filed Jul. 6, 2006.

U.S. Appl. No. 11/467,141, Riveiro, Multi-Wideband Communications over Power Lines, filed Aug 24, 2006.

U.S. Appl. No. 11/536,539, Riveiro, Multi-Wideband Communications over Power Lines, filed Sep. 28, 2006.

U.S. Appl. No. 11/562,380, Romero, Network Repeater, filed Nov. 21, 2006.

U.S. Appl. No. 11/619,167, Ruiz, Unknown Destination Traffic Repetition, filed Jan. 2, 2007.

Gardner, S. et al., "HomePlug Standard Brings Networking to the Home," CSD, Dec. 2000, located at http://www.commsdesign.com/main/2000/12/0012feat5.htm.
UPA—Universal Powerline Association, "Frequently Asked Questions," date unknown, located at http://www.upaplc.org/page_viewer.asp?section=FAQ&sid=3, visited Aug. 21, 2006.
Adaptive Networks, Inc., "PowerStream™ Technology Background," 2002.
Stelts, "CEPCA Standard Summary," 2006, available at http://www.cepca.org/home/CEPCA_OpenForum.pps.
UPA, "Digital Home Standard," 2005, available at http://www.upaplc.org/page_viewer.asp?section=Resources&sid=10&page=Current+Specifications&pid=7.
UPA, "Powerline Communications Systems-Access/In-home &In-home/In-home coexistence mechanism-General Specifications," 2005, available at http://www.upaplc.org/page_viewer.asp?section=Resources&sid=10&page=Current+Specifications&pid=7.
Opera, "Opera Technology Specification-Part 1," Jan. 31, 2006, available at http://www.upaplc.org/page_viewer.asp?section=Resources&sid=10&page=Current+Specifications&pid=7.
Opera, "Opera System Specification-Part 2," Jan. 31, 2006, available at http://www.upaplc.org/page_viewer.asp?section=Resources&sid=10&page=Ourrent+Specifications&pid=7.
HomePlug, "HomePlug 1.0 Technology White Paper," date unknown, available at http://www.homeplug.org/en/products/whitepapers.asp.
HomePlug, "HomePlug AV White Paper," 2005, available at http://www.homeplug.org/en/products/whitepapers.asp.
Yukitoshi, Sanada, A Multiuser Interference Cancellation Technique Utilizing Convolutional Colds and Orthogonal Multicarrier Modulation for Wireless Indoor Communications, IEEE Journal of Selected Areas in Communications, vol. 14, No. 8, Oct. 1996, pp. 1500-1508.
Kouvatsos, D., et al., Broadcasting Methods in Ad Hoc Networks: An Overview, Proceeding of the 3rd International Working conference on Performance Modelling and Evaluation of Heterogeneous Networks, Jul. 20, 2005, pp. 1-14.
Juttner, A., et al., Tree Based Broadcast in Ad Hoc Networks, Sep. 9, 2004, pp. 1-21, Errisson Research, Traffic Analysis and Network Performance Laboratory, Budapest, Hungary.
Gardner, S., et al., HomePlug Standard Brings Networking to the Home, CSD, Dec. 2000.
UPA—Universal Powerline Association, Frequently Asked Questions, date unknown.
Powerstream Technology Background, Adaptive Networks, Inc., 2002.
Stelts, Michael, CEPCA Standard Summary, 2006.
Digital Home Statndard, Universal Powerline Association (UPA), 2005.
Powerline Communications Systems-Access/In-home & In-home/In-home Coexistence Mechanism-General Specifications, Universal Powerline Association (UPA), Jun. 27, 2005.
Opera Technology Specification—Part 1, Open PLC European Research Alliance (OPERA), Jan. 31, 2006.
Opera System Specification—Part 2, Open PLC European Research Alliance (OPERA), Jan. 31, 2006.
HomePlug 1.0 Technology White Paper, HomePlug Powerline Alliance.
HomePlug AV White Paper, HomePlug Powerline Alliance, 2005.
"Broadband Powerline Communications Systems, A Background Brief," Australian Communications Authority, Sep. 2003.
Int'l Search Report and Written Opinion, PCT/EP2009/057284, Dated Aug. 28, 2009.
Int'l Search Report, PCT/US2007/015508, Dated Jun. 28, 2008.
Int'l Preliminary Report on Patentability, PCT/US2007/015508, Dated Jan. 6, 2009.
Int'l Preliminary Report on Patentability, PCT/US2007/016736, Dated Jan. 27, 2009.
Int'l Search Report, PCT/GB2006/003665, Dated Mar. 12, 2007.
Written Opinion, PCT/GB2006/003665, Dated Apr. 3, 2008.
Int'l Search Report, PCT/US2008/00020, Dated Oct. 2, 2008.
Written Opinion, PCT/US2008/00020, Dated Apr. 14, 2008.
Int'l Search Report, PCT/GB2008/050364, Dated Aug. 19, 2008.
Int'l Search Report, PCT/GB2008/050365, Dated Aug. 13, 2008.
Tang, C.; Stolpman, V.J., "Multiple Users Adaptive Modulation Schemes for MC-CDMA," Global Telecommunications Conference, 2004. GLOBECOM '04. IEEE, vol. 6, pp. 3823-3827 Nov. 29-Dec. 3, 2004.
Crussiere, M.; Baudais, J.-Y.; Herlard, J.-F., "Robust and High-Bit Rate Communications over PLC Channels: a Bit-Loading Multi-Carrier Spread Spectrum Solution," Power Line Communications and its Applications, 2005 International Symposium on, pp. 37-41, Apr. 6-8, 2005.
Cheong Yui Wong; Cheng, R.S.; Lataief, K.B.; Murch, R.D., "Multiuser OFDM with Adaptive Subcarrier, Bit, and Power Allocation," Selected Areas in Communications, IEEE Journal on, vol. 17, No. 10, pp. 1747-1758, Oct. 1999.
U.S. Appl. No. 12/484,754 Amendment B, filed Jun. 21, 2010.
U.S. Appl. No. 12/484,754 Final Office Action, Dated Sep. 13, 2010.
U.S. Appl. No. 12/484,754 Amendment C, filed Oct. 18, 2010.
U.S. Appl. No. 12/484,754 Amendment D, filed Nov. 5, 2010.
U.S. Appl. No. 11/536,539 Applicant Amendment C, filed Jun. 22, 2010.
U.S. Appl. No. 11/536,539 Final Office Action, Dated Sep. 1, 2010.
U.S. Appl. No. 11/536,539 Applicant Amendment D, filed Oct. 29, 2010.
U.S. Appl. No. 11/536,539 Petition to Withdraw Finality, filed Nov. 1, 2010.
U.S. Appl. No. 11/467,141 Office Action, Dated Aug. 30, 2010.
U.S. Appl. No.11/467,141 Amendment C, filed Oct. 14, 2010.
U.S. Appl. No. 11/752,865 Amendment A, filed Jun. 16, 2010.
U.S. Appl. No. 11/752,865 Final Rejection, Dated Sep. 2, 2010.
Int'l Search Report and Written Opinion, PCT/US07/24309, Dated Jun. 25, 2010.
Int'l Search Report and Written Opinion, PCT/US10/49182, Dated Nov. 3, 2010.
Int'l Search Report and Written Opinion, PCT/US10/49184, Dated Nov. 8, 2010.
U.S. Appl. No. 12/554,400, Riveiro, Multi-Wideband Communications over Power Lines, filed Sep. 4, 2009.
U.S. Appl. No. 11/855,081, Danesh, Wireline Transmission Circuit, filed Sep. 13, 2007.
U.S. Appl. No. 12/177,377, Danesh, Wireline Transmission Circuit, filed Jul. 22, 2008.
U.S. Appl. No. 12/250,450, Hurwitz, Programmable Gain Amplifier, filed Oct. 13, 2008.
U.S. Appl. No. 12/577,536, Hurwitz, Programmable Gain Amplifier and Transconductance Compensation System, filed Oct. 12, 2009.
U.S. Appl. No. 12/484,754, Riveiro, Power Line Communication Networks and Methods employing Multiple Widebands, filed Jun. 18, 2009.
U.S. Appl. No. 12/564,376, Hurwitz, Discharge Digital-to-Analog Converter, filed Sep. 22, 2009.
U.S. Appl. No. 12/564,810, Hurwitz, Radio Frequency Circuit, filed Sep. 22, 2009.
Int'l Search Report and Written Opinion, PCT/US09/48090, Dated Dec. 2, 2009.
Int'l Search Report and Written Opinion, PCT/US09/60478, Dated Dec. 3, 2009.
Int'l Search Report and Written Opinion, PCT/US09/60482, Dated Dec. 2, 2009.
Int'l Search Report and Written Opinion, PCT/US10/24125, Dated Apr. 15, 2010.
U.S. Appl. No. 11/752,865 Non-Final Rejection, Dated Jan. 27, 2010.
U.S. Appl. No. 11/467,141 Applicant Summary of Interview with Examiner, Dated Jan. 7, 2009.
U.S. Appl. No. 11/467,141 Applicant Summary of Interview with Examiner, Dated Feb. 2, 2009.
U.S. Appl. No. 11/467,141 Non-Final Rejection, Dated Feb. 17, 2009.
U.S. Appl. No. 11/467,141 Applicant Amendment A, Dated Mar. 19, 2009.
U.S. Appl. No. 11/467,141 Final Rejection, Dated May 28, 2009.
U.S. Appl. No. 11/467,141 Pre-Appeal Request for Review, Dated Nov. 13, 2009.
U.S. Appl. No. 11/467,141 Appeal Brief, Dated Mar. 17, 2010.

U.S. Appl. No. 12/484,754 Non-Final Rejection, Dated Jun. 1, 2010.
U.S. Appl. No. 11/536,539 Non-Final Rejection, Dated Apr. 30, 2009.
U.S. Appl. No. 11/536,539 Applicant Amendment A, Dated Jul. 30, 2009.
U.S. Appl. No. 11/536,539 Non-Final Rejection, Dated Nov. 3, 2009.
U.S. Appl. No. 11/536,539 Applicant Amendment B, Dated Jan. 14, 2010.
U.S. Appl. No. 11/536,539 Non-Final Rejection, Dated Apr. 1, 2010.

* cited by examiner

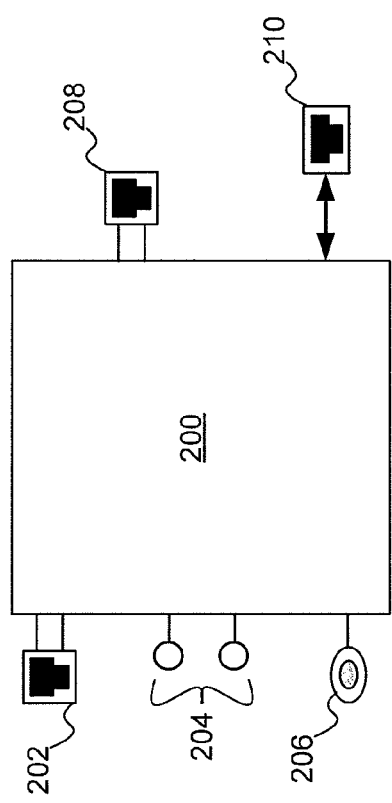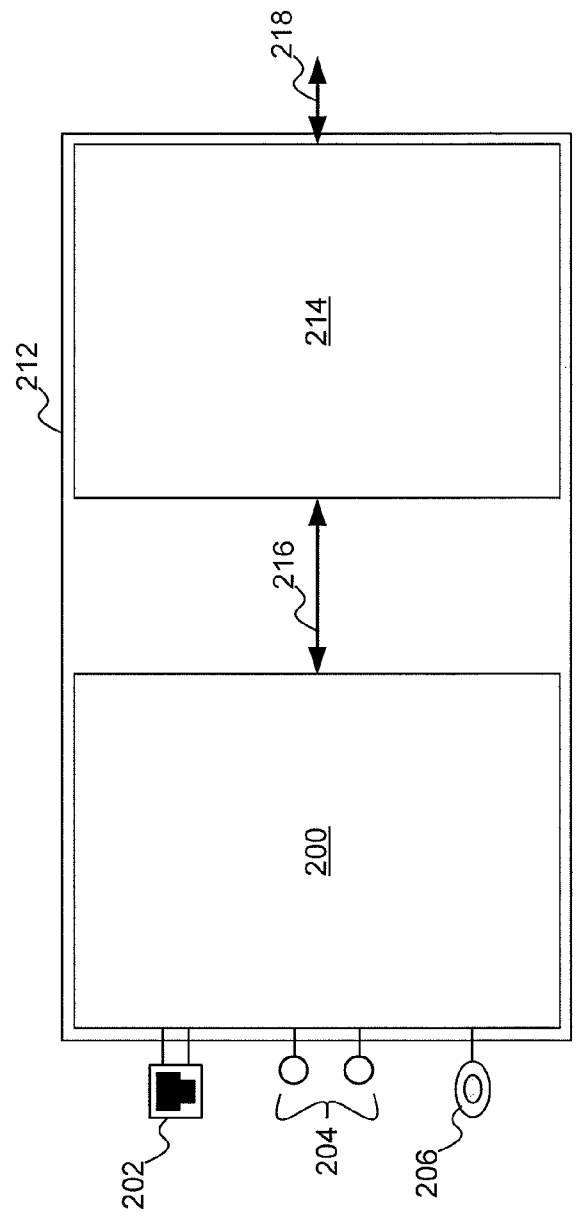

MULTI-WIDEBAND COMMUNICATIONS OVER MULTIPLE MEDIUMS

CROSS-REFERENCES

This nonprovisional U.S. patent application is a continuation-in-part of nonprovisional U.S. patent application Ser. No. 11/536,539 filed Sep. 28, 2006 and entitled "Multi-Wideband Communications over Powerlines," which claims benefit of and priority to European Patent Application EP 05 256 179.2, entitled "Power line Communication Device and Method," filed Oct. 3, 2005 under 35 U.S.C. 119; a continuation-in-part of nonprovisional U.S. patent application Ser. No. 11/562,380 filed Nov. 21, 2006 and entitled "Network Repeater;" and a continuation-in-part of nonprovisional U.S. patent application Ser. No. 11/619,167 filed Jan. 2, 2007 and entitled "Unknown Destination Traffic Repetition" all of which are hereby incorporated herein by reference.

BACKGROUND

1. Field of Invention

The present application relates generally to communications and more specifically to multi-wideband communications over multiple mediums.

2. Description of the Related Art

Typically, residences such as houses, apartments, and condominiums have multiple types of wires for power and/or communications. For example, a house may typically have one or more ring mains, or may have multiple spurs configured to supply power to most, if not all, of the rooms in the house. The house may additionally have one or more telephone line connections, including multiple extensions accessible in various rooms. The telephone line may provide telephone communications and/or Internet access using a digital subscriber line (DSL) standard. Many homes additionally have one or more coaxial cable connections to a number of rooms. For example, cable television programming or satellite television programming, or terrestrial analog television may be received via the coaxial cable. In some cases the phone line or coax in the home may be unused by any apparatus. Further, networked apparatuses may communicate via Ethernet cabling.

Many households include devices that communicate with one another. For example, a television set may communicate with a digital versatile disc (DVD) player to display a movie on the television set. These communications require separate wires and/or cables connecting the DVD player to the television set. These device-to-device wires can become very complex, if, for example, other components such as a stereo system are also connected to the television set. Further, the stereo system may be separately connected via another wire to a personal computer or media player. The use of a dedicated wire between devices additionally limits which devices are able to communicate with one another. For example, many homeowners are reluctant to connect a very long wire from, for example, a television in the kitchen to a DVD player in a bedroom. In addition, with the rise of digital content, such as JPEG digital photographs, MP3 digital music and MPEG digital video, that can arrive from multiple sources, such as the cable service provider or the internet, and could be stored in different devices in the home, such as the Personal Computer (PC) or a Personal Video Recorder (PVR) or a Set Top Box (STB), there is a need to create a digital in-home network that can distribute the digital content through network connected devices throughout the home with high performance and reliability.

Powerline communication (PLC) is a technology that encodes digital data in a signal and transmits the signal on existing electricity powerlines in a band of frequencies that are not used for supplying electrical power. Accordingly, PLC leverages the ubiquity of sockets within existing power supply networks to provide an extensive number of possible connection points to form a network.

Referring to FIG. 1, a powerline network in a household 100 typically has a distributed mains wiring system consisting of one or more ring mains, several stubs or spurs and some distribution back to a junction box 104. For example, the household 100 is supplied electrical power from an external line 102. The junction box 104 routes the electrical power among ring mains 106, 108, and 110. The household 100 further comprises a telephone line network 112. The telephone line network 112, as shown, does not require a junction box or division among multiple rings. It should be noted that the powerline network is typically more widely distributed to outlets and rooms than the telephone line network 112.

As shown in FIG. 1, there are a variety of distances and paths between different power outlets in the household. In particular, the outlets most closely located to each other are those on multi-plug strips, and the outlets furthest away from each other are those on the ends of stubs of different ring mains (e.g. power outlets in the first floor and the second floor). Communications between these furthest outlets typically pass through the junction box 104. In some PLC systems, it may be difficult to pass communications through the junction box, particularly if they are on different alternating current (AC) phases.

There is, therefore, a need for improved communications systems that overcome the above and other problems.

SUMMARY

A communications device for simultaneous multi-wideband communications over multiple mediums is provided. The multiple mediums may include, for example, a powerline, a telephone line, and/or a coaxial cable. In some embodiments, a communication may be transmitted or received via any of the mediums. A communication may be received via a first medium and forwarded in a second medium. In some embodiments, a third medium may also be available for reception and/or transmission of the communication. For example, a multi-network interface device may receive a communication via a powerline and forward the received communication via a telephone line. Further, a communication between two multi-network interface devices may be transmitted, in parallel or sequentially, through two or more mediums within a communications network. For example, a video signal may be transmitted from a DVD player to a television via both the powerline and a coaxial cable. In various embodiments, one medium may be used to bridge two portions of another medium. For example, to bypass a junction box or to reach part of the network on a different AC phase, a telephone line may be used as a bridge between sections of mains cable or sections on different AC phases in a powerline network.

The various media may be used in conjunction with multi-wideband communications. The multi-widebands include, for example, a lower frequency range below approximately thirty megahertz and a higher frequency range above approximately thirty megahertz. In some embodiments, the lower frequency range is between two megahertz and twenty-eight megahertz while the higher frequency range is between fifty megahertz and three hundred megahertz. The lower frequency band may be conducted via the powerline, and the higher frequency band may be conducted via the powerline and/or another medium such as a telephone wire or coax cabling. A single media may be used for communications using both lower and higher frequency ranges. In some embodiments, higher frequency signals may be moved to another frequency range by mixing, for example to take the signal to above an existing service on the wire, such as in the case of a coaxial cable that already caries analog or digital television information. In these embodiments, the higher frequency band may be moved, for example, between 1.2 gigahertz and 1.45 gigahertz or between 1.55 gigahertz and 1.8 gigahertz. In other embodiments, a portion of the higher frequency band may be above 2 gigahertz. In some embodiments, a signal in the higher frequency bands may comprise an ultra-wideband signal at least 500 megahertz wide.

Communications over the various media may be supported by a single reference design having a single power source. The single reference design is optionally a single unit that comprises filters and other components configured to enable connection to different mediums and passing the communications over these mediums. For example, the single reference design may comprise multiple interfaces configured to communicate over telephone line, powerline, and/or coaxial cable. The single reference design may further allow the different mediums to share a single media access control (MAC) address. The single reference design may be powered via the powerline communications interface. In some embodiments, communications may be received and/or transmitted using powerlines and either telephone lines or coaxial cables. Further, the single reference design may comprise a single host interface controller configured to communicate with a networked apparatus.

According to various embodiments, a powerline communications device comprises a powerline communications interface, a second communications interface, and a processor. The powerline communications interface is configured to transmit a message via a powerline. The second communications interface is configured to transmit the message via a second medium. The processor is configured to determine, in the alternative, whether to transmit the message via the powerline or the second communications interface based on a quality of service metric associated with the powerline network.

According to various embodiments, a powerline communications device comprises a network processor and a host interface controller. The network processor comprises logic configured to determine whether to alternatively communicate a message via a powerline communications interface or a second communications interface, the second communications interface being configured to communicate via a telephone line or a coaxial cable, both the powerline communications interface and the second communications interface being associated with a same media access control address. The host interface controller is configured to be shared by communications received through the powerline communications interface and the second communications interface.

According to various embodiments, a network comprises a first section of mains cable configured to provide AC power, a second section of mains cable configured to provide AC power and connected to the first section of mains cable via a junction box, a telephone network, a first device configured to receive a message via the first section of mains cable and forward the message via the telephone network, and a second device configured to receive the message from the first device via the telephone network, and to forward the message via the second section of mains cable.

According to various embodiments, a method comprises generating a message; transmitting the message via a first section of mains cable connected to a second section of mains cable via a junction box; receiving the message at a first device; transmitting the message from the first device, via a telephone line or a coaxial cable; receiving the message from the first device, at a second device; and transmitting the message from the second device, via the second section of mains cable.

According to various embodiments, a network comprises a first section of mains cable configured to provide AC power, a second section of mains cable configured to provide AC power and connected to the first section of mains cable via a junction box, a coaxial cable network, a first device configured to receive a message via the first section of mains cable and forward the message via the coaxial cable network, and a second device configured to receive the message from the first device via the coaxial cable network, and to forward the message via the second section of mains cable.

BRIEF DESCRIPTION OF THE DRAWINGS

Multiple embodiments of the invention will now be described by way of example only with reference to the accompanying Figures in which:

FIG. 2A is a diagram of an exemplary multi-network interface device comprising a plurality of interfaces for communicating over various mediums, according to various embodiments;

FIG. 2B is a diagram of an exemplary embedded multi-network interface device comprising a plurality of interfaces for communicating over various mediums, according to various embodiments;

DETAILED DESCRIPTION

Figure 1:
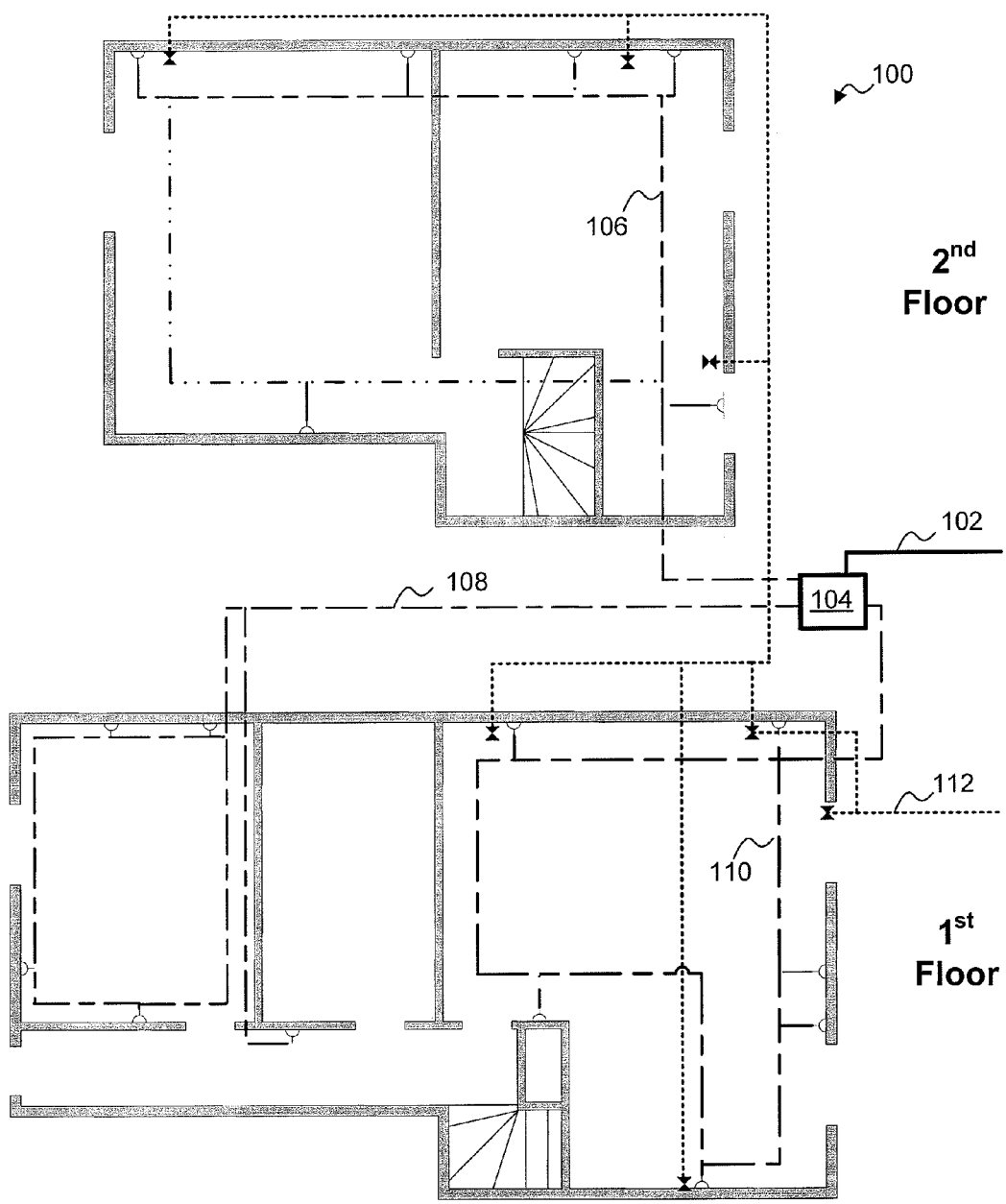
FIG. 1 is a diagram of a prior art household.

For the sake of clarity, the term "powerline" will be used herein to refer to low voltage household or commercial mains distribution cabling (typically 100-240 V AC power) or any other distributed electrically conductive AC cabling that is capable of passing power to appliances connected to it. Furthermore, the term "powerline technology" will be used herein to refer to a specification that when implemented as a series of network interface devices connected to a powerline, enables the devices to bi-directionally communicate with each other using signals superimposed on the power distribution AC voltages also present on the powerline.

The term "multi-network interface device" will be used herein to describe an apparatus that implements either fully or partially, at least two communications technologies, such as a powerline technology, a telephone line technology, or a coaxial cable technology to enable the apparatus to communicate with other devices connected via the same communications technology (such as a powerline, telephone line, or coaxial cable) to a network, regardless of whether or not the apparatus is integrated with other apparatuses or functions within a single enclosure. In some embodiments, the multi-network interface device may be a powerline communications device having additional communications interfaces for communicating via a phone line and/or a coaxial cable.

For the sake of clarity, in terms of explanation of operation of the multi-network interface device around current powerline, telephone line, and coaxial cable technologies, a frequency band used in the multi-network interface device comprising a frequency of less than about 30 MHz, will be known herein as a "low band(s)". Similarly, a frequency band(s) used in the powerline communication devices, telephone line communications devices, and coaxial cable communications devices whose frequency is greater than about 30 MHz will be known herein as "high band(s)."

For the sake of simplicity, the term "signal path" will be used to refer to the path of a signal transmitted or received from a network apparatus to the powerline, telephone line or coaxial cable.

The term "separate," as used herein with respect to frequency bands, is to characterize frequency bands that do not use, except incidentally, the same frequencies for communication data or commands. Frequency bands may be separate but interleaved, e.g., overlapping.

The term "simultaneously" is used herein with respect to communicating data to indicate that at least part of first data or commands are communicated using a first frequency band and/or medium at the same time as at least part of second data or commands are communicated using a second frequency band and/or medium. For example, simultaneous transmission is contrasted with systems that alternate or interleave the use of frequency ranges, one frequency range after the other or hopping from one frequency range to the other frequency range while not using both frequency ranges at the same moment.

The term "independent" is used herein with respect to data transmitted to indicate that data transmitted using one frequency band does not depend on data transmitted using another frequency band. Independent data transmission can include, for example, data sent to or received from different locations. Data in which alternative bits are transmitted using different frequencies is not independent because the bits are dependent on each other to form a useful byte. Data transmitted in a first frequency band and including communication setup information, decryption keys, communication commands, or the like is considered independent from data sent in a second frequency band, even when the receipt or processing of the data sent in the second frequency band may use the data in the first frequency band. This is because, transmission of the communication setup information, decryption keys, communication commands, or the like does not depend on the data sent in the second frequency band.

The term "wideband" is used herein to refer to a frequency band or range used by a powerline, telephone line, or coaxial cable technology signal, characterized by having a bandwidth of greater than, or equal to, about 5 MHz from the first (lowest) frequency to the last (highest) frequency of the band irrespective of the presence of notches. However, in various embodiments, wideband may have bandwidths of at least 5, 7, 10, 12, 15, 20, 100, 250 or 500 MHz. A wideband may include many different carrier channels used to convey data. For example, in various embodiments, widebands include more than 25, 50, 100, 250, 500, or 1000 data carrier frequencies with or without CDMA sequences. Various embodiments of the invention may make use of wide or narrow frequency bands.

The term "section of mains cable" is used herein to refer to various sections of cabling in a typical AC electrical wiring system in a home or building or dwelling. The various sections may be separated from each other by the electrical distribution means, such as a junction box, fuse box, surge protector, residual current detector, or the like. An individual section of mains cable may be on a different AC phase than other sections of mains cable within the dwelling. There may be one or more sockets, switches and/or appliances associated with a single section of mains cable. The section of mains cable may comprise two or three core class cables with or without shielding. The AC electrical wiring system may transfer electricity having a voltage of approximately 110 Volts, 240 Volts, or other standard voltage levels. The section of mains cable may comprise, at least in part, a ring main or loop. The section of mains cable may comprise, at least in part, a spur that may be part of a branch-based arrangement.

It will be appreciated that the specific network and other examples described in these sections are used for illustrative purposes only. In particular, the examples described in these sections should in no way be construed as limiting the disclosed communication devices.

Some embodiments of the communications network comprise a plurality of nodes of which some employ a multi-network interface device that enables simultaneous and/or independent communication over two or more mediums. A first frequency band optionally comprises frequencies of less than 30 MHz and the other frequency band(s) comprise frequencies of greater than 30 MHz. Alternatively, both a first and a second frequency band may comprise frequencies greater than 30 MHz. Because of the multiple frequency bands can be in different ranges, communications can be optimized for each of the mediums such that the trade-off between cost, coverage, and throughput will be superior to that achieved by a network comprising a single medium.

The computing network comprising powerlines, telephone lines, and/or coaxial cable provides inter-operability with prior art powerline technologies by also supporting communication between multi-medium nodes and single medium nodes (that communicate via a single medium (e.g. powerline).

The multi-network interface device may be part of an external modem apparatus or embedded within another apparatus (e.g. computer, television, etc.). However, regardless of the manner in which the multi-network interface device is included within a network node, the device remains connected to electrically conductive cabling (that passes AC power) and is capable of transmitting data across the cabling using the low and/or high bands. Further, the multi-network interface device is capable of communicating over more than one medium (e.g. telephone line, coaxial cable, or powerline).

The multi-network interface device typically employs an analog signal separation device configured to isolate data communication paths from AC power transmission, prior art telephone line communication, and/or prior art coaxial cable communication, to an apparatus. One of the most efficient ways of providing this isolation is by high-pass filtering or band-pass filtering whilst minimizing out-of band signals in the low band. For example, high band signals may be filtered using high linearity components and low band signals may be filtered using analog low-pass smoothing or anti-aliasing. It may not be necessary to perform the isolation on both receiver and transmitter signal paths (depending on the specifications of the analog components and the modulation techniques employed therein).

Signals in the high band and the low band can use the same or different modulation techniques (e.g. Orthogonal Frequency Division Multiplexing (OFDM), and/or Code Division Multiple Access (CDMA)) or time division schemes to facilitate co-existence and/or bi-directional communication. In one embodiment, the low band employs a modulation scheme that is inter-operable with one of the existing powerline modem standards or proposals, whilst the high band on the powerline is used for performance expansion beyond previous standards or in other mediums. Data and/or control commands can be passed through one or both of the mediums simultaneously and via a plurality of multi-network interface devices in the form of a repeater (e.g., relay) network. As such, it is possible for the frequency bands to overlap slightly, and to include different frequency ranges or bandwidths, relative to those cited herein.

In some embodiments, different types of signals are communicated in different frequency bands. For example, in one embodiment, communication setup information, node discovery signals, path discovery signals, encryption or decryption keys, communication commands, and/or other types of command and control signals are communicated in a first frequency band while other types of data (e.g., non-command and control) are communicated in a second frequency band. The other types of data communicated in the second frequency band may include video, audio, and/or text, etc.

FIG. 2A is a diagram of an exemplary multi-network interface device 200 comprising a plurality of interfaces for communicating over various mediums. The exemplary multi-network interface device 200 may be a separate device, such as an adapter, or embedded into a network apparatus such as a television, stereo, DVD player, personal computer, or the like. The multi-network interface device 200 may comprise one or more communications interfaces including a phone line interface 202, a powerline interface 204, and/or a coaxial cable interface 206. The communications interfaces are each configured to communicate over their respective mediums. The multi-network interface device 200 may further comprise one or more interfaces for communication with an apparatus connected to the multi-network interface device 200. For example, as shown, the multi-network interface device 200 comprises a second set of communications interfaces including a second phone line interface 208 and an Ethernet interface 210 configured to connect to telephone and an Ethernet network apparatus, respectively.

Communications over the various media may be supported by a single reference design having a single power source. The single reference design is optionally a single device that comprises filters and other components configured to enable connection to different mediums and passing the communications over these mediums. For example, the single reference design may comprise multiple interfaces configured to communicate over telephone line, powerline, and/or coaxial cable. The single reference design may further allow the different mediums to share a single media access control (MAC) address. The single reference design may be powered via the powerline communications interface. Further, the single reference design may comprise a single host interface controller configured to be shared by communications using the various mediums.

The telephone interface 202 is configured to communicate over a telephone line network. The telephone interface may, in addition to communicating high band signal(s), simultaneously communicate voice signals, DSL signals (including ADSL and VDSL signals), Home Phoneline Networking Alliance (HPNA)-compatible signals, and/or the like. Additionally, the telephone line may already carry these types of signals generated by other sources in other locations.

The powerline interface 204 may comprise an interface configured to receive electrical power via a powerline. The powerline interface 204 may comprise a male and/or female connector.

The coaxial cable interface 206 is configured to communicate via a coaxial cable network. The coaxial cable interface, may, in addition to communicating high band communication signal(s), also communicate DSL signals, Data Over Cable Service Interface Specification (DOCSIS)-compatible signals, television broadcast signals (including cable television and/or digital television signals), Multimedia over Coax Alliance (MoCA)-compatible signals, Satellite L-Band signals, and/or the like. Additionally, the coaxial cable may already carry these types of signals generated by other sources in other locations.

The second telephone interface 208 is configured to communicate a signal between the multi-network interface device 200 and a device. For example, the second telephone interface 208 may communicate with a telephone or a DSL modem. In other embodiments, the multi-network interface device 200 may comprise a second coaxial cable interface 206 and/or a second powerline interface 204. Second telephone interface 208 may be connected to a telephone and be used to communicate a telephone call.

The Ethernet interface 210 is one example of a host interface and is configured to communicate a signal between the multi-network interface device 200 and a device configured to communicate over an Ethernet connection. The Ethernet interface may, for example, be connected to a personal computer, media player, or WiFi modem. The Ethernet interface 210 may be part of a device compatible with the Universal Plug'n Play (UPnP) standard, Digital Living Network Alliance (DLNA) standard, or the like.

In operation, the communications signal may travel on one or more of the mediums to reach the multi-network interface device 200 from another node on the network. The multi-network interface device 200 may be configured to determine the medium on which to transmit the communications signal based on a Quality of Service (QoS) metric associated with each medium. The QoS metric may measure network latency, network throughput, available bandwidth, or the like. The multi-network interface device 200 may vary which medium is used to transmit signals if the QoS metric changes over time.

Signals are received at one of the interfaces (telephone line interface 202, the powerline interface 204, the coaxial cable interface 206, the second telephone line interface 208, and/or the Ethernet interface 210) where they may be filtered, converted, frequency shifted, modulated, mixed, or otherwise modified the signal to generate a desirable output signal. The output signal may be transmitted via any of the interfaces including the telephone line interface 202, the powerline interface 204, the coaxial cable interface 206, the second telephone line interface 208, and/or the Ethernet interface 210.

In some embodiments, the multi-network interface device 200 is associated with a single media access control (MAC) address. That is, communications received via any of the mediums may be addressed to the same MAC address. In some embodiments, the multi-network interface device 200 may be associated with two or more MAC addresses and/or have two or more Ethernet interfaces 210. In these embodiments, the multi-network interface device 200 may comprise a router and routing table, a switch, or the like.

In some embodiments having more than one interface, such as those shown, the signal may substantially "pass through" the communication device 200. To illustrate, the multi-network interface device 200 may be connected to the telephone line via the telephone line communications interface 202. As telephone line connections typically occur less frequently than other connections in a home, a homeowner may wish to install a telephone in the same telephone line connection. Hence, by including the second telephone line communications interface 208, the homeowner may install the multi-network interface device 200 while still being able to use the same telephone line connection for a telephone.

FIG. 2B is a diagram of an exemplary apparatus 212 comprising an embedded multi-network interface device 200 having a plurality of interfaces for communicating over various mediums, according to various embodiments. The apparatus 212 comprises the multi-network interface device 200, a host subsystem 214, a host interface 216, and an apparatus interface 218.

The apparatus 212 may comprise a network apparatus such as a set top box, a DSL Home Gateway, a television set, a DVD player, a kitchen appliance (e.g. a refrigerator, microwave, stove, oven, etc.), a wireless access point, a computing device, a data storage device, a stereo, or the like. The host subsystem 214 comprises the prior art hardware and/or software included in the network apparatus, e.g., the television receiver or the DVD reader. The host interface 206 comprises a communications interface between the multi-network interface device 200 and host subsystem 214. The apparatus interface 218 is an output or input of the host subsystem 214 as known in the prior art.

Figure 2C:
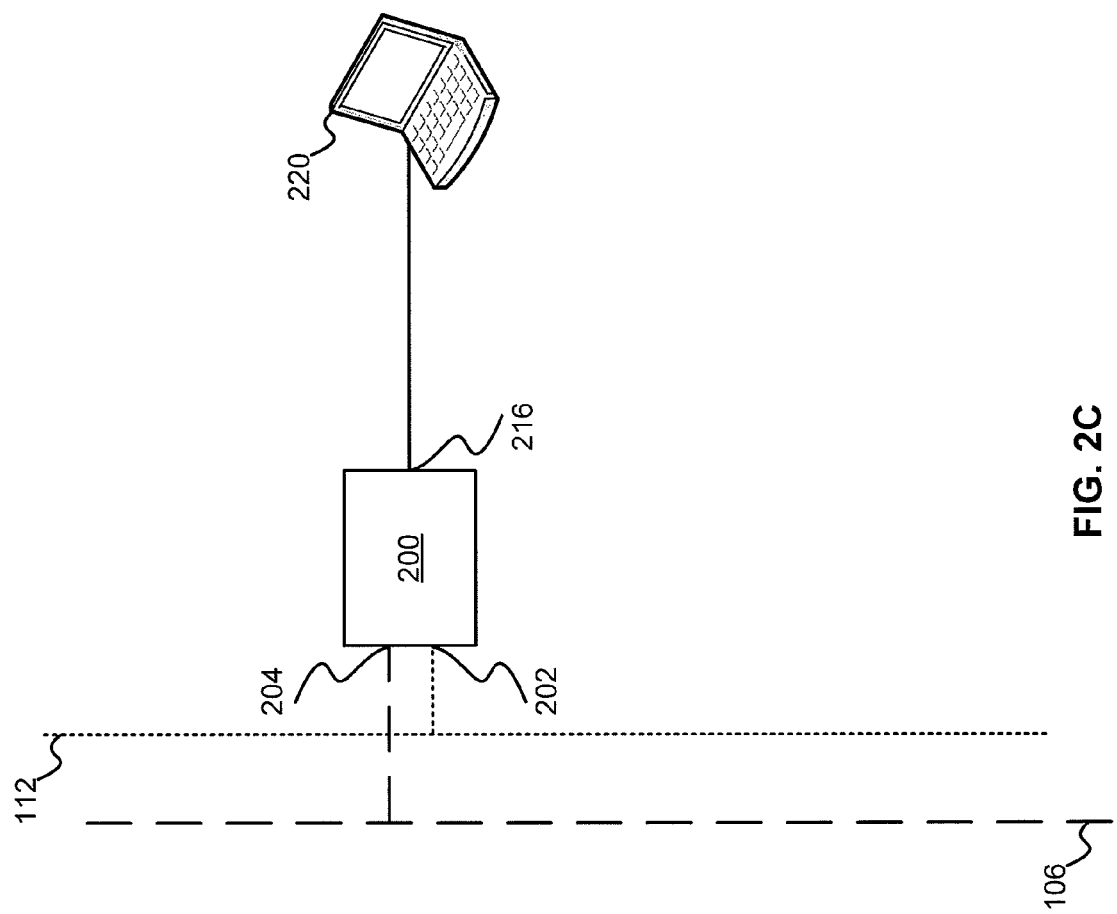
FIG. 2C is a diagram of an exemplary multi-network interface device connected to a network apparatus, according to various embodiments.

FIG. 2C is a diagram of an exemplary multi-network interface device 200 connected to a separate network apparatus 220. In the shown embodiment, the multi-network interface device 200 is connected to a powerline 106 and a telephone line 112, via the powerline interface 204 and the telephone line interface 202, respectively. The multi-network interface device 200 is also connected to the network apparatus 220 via a host interface 216 to the network apparatus 220. One example of the host interface 216 is the Ethernet interface 210. As shown in one embodiment, the network apparatus 220 comprises a laptop computer. In other embodiments, the network apparatus 220 may comprise a set top box, a DSL Home Gateway, a television set, a DVD player, a kitchen appliance (e.g. a refrigerator, microwave, stove, oven, etc.), a wireless access point, a computing device, a data storage device, a stereo, or the like.

Generally, the host interface 216 is configured to communicate directly with a network apparatus and to act as a first interface between the network apparatus and the rest of the network. In comparison with other interfaces of the multi-network interface device 200, the host interface 216 is optionally connected to just the network apparatus 220 rather than a network including multiple devices and/or mediums. Typically, the host interface 216 is configured to provide communications between the network apparatus 220 and the multi-network interface device 200 over a single medium. As is illustrated in FIGS. 2B and 2C, the host interface 216 may be embedded within an apparatus 212 or may be an interface between the separate devices (e.g., multi-network interface device 200 and the network apparatus 220).

The host interface 216 is one example of a "host interface." For example, a host interface may be a boundary between two entities that exchange data using Ethernet class II packets and interfaces associated with a direct application endpoint or start point. Examples of Ethernet class II packets include IEEE 802.3 packets with or without IEEE 802.2 (Logical Link Control (LLC)), IEEE 802.1H (Sub Network Access Protocol (SNAP)) extensions and/or Virtual Local Area Network (VLAN) tagging. Further examples of the host interface 216 include: Ethernet 10/100/1000, Media Independent Interface (MII), Gigabit Media Independent Interface (GMII), Peripheral Component Interconnect (PCI), Host Processor Interface, Universal Serial Bus (USB) 2.0, Firewire, Peripheral Component Interconnect Extended (PCI-X), Peripheral Component Interconnect Express (PCIe), Universal Asynchronous Receiver Transmitter (UART), Service Provider Interface (SPI), or the like. Examples of host interface 216 associated with a direct application end point or start point include: Serial Advanced Technology Attachment (SATA) I/II/III, Universal Serial Bus (USB) 2.0, Inter-Integrated Circuit Sound (I2S), Universal Asynchronous Receiver Transmitter (UART), Infrared Data Association (IrDA) protocols, Moving Picture Experts Group (MPEG) Transport Stream (TS), High-Definition Multimedia Interface (HDMI), and Video Graphics Array (VGA).

Figure 3:
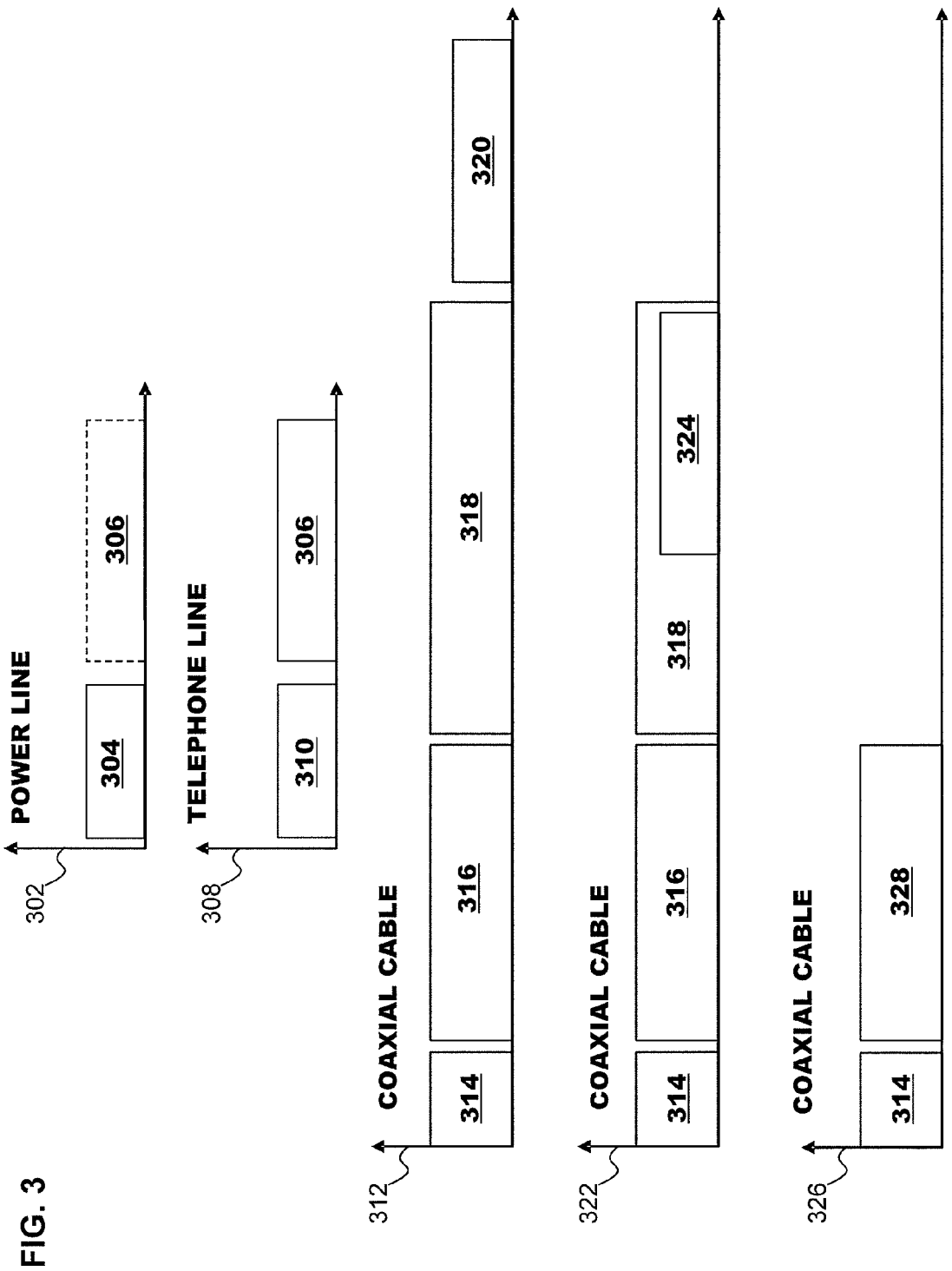
FIG. 3 includes exemplary communications transmission spectra of three mediums, according to various embodiments.

FIG. 3 includes exemplary communications transmission spectra of three mediums, according to various embodiments. Any or all of the mediums (powerlines, telephone lines, and/or coaxial cable) may be present in a network. In some embodiments, the various frequency bands depicted in FIG. 3 may comprise widebands and/or narrow bands. Other, different, communications spectra may be used in alternative embodiments. In the spectra depicted, the x-axis represents frequency.

In a spectrum 302, a communications transmission spectrum as may be associated with a powerline is shown. The spectrum 302 comprises a low band 304 and a high band 306. The low band 304 may comprise frequency bands below approximately thirty megahertz. The low band 304 may include base band powerline communications frequencies as described in the HomePlug AV standard (i.e. two megahertz to thirty megahertz). The high band 306 comprises one or more frequency bands above approximately thirty megahertz (e.g. fifty megahertz to three hundred megahertz). In some embodiments, the high band 306 may comprise a frequency band above one gigahertz. In some embodiments, use of the high band 306 is optional. Communications signals may be transmitted on the powerline in both the low band 304 and the high band 306 simultaneously and/or independently.

In a spectrum 308, a communications transmission spectrum as may be associated with a telephone line is shown. The spectrum comprises a lower frequency band 310 on which communications of the prior art are transmitted. These communications include voice telephony, ADSL, VDSL, HPNA, and the like. The high band 306, used in powerline communications, may also be used on the telephone line.

In spectrums 312, 322, and 326, alternate communication transmission spectra associated with coaxial cable technologies are shown. These transmission spectra include some frequency bands used for communications in the prior art. A frequency band 314, for example, is currently associated with DSL standards and DOCSIS. A frequency band 316 is associated with television broadcasts, cable television, and digital television. Frequency band 318 is associated with the MoCA standard and the Satellite L-Band between three hundred ninety megahertz and 1.55 gigahertz.

In spectrum 312, the communication signal associated with a home network is transmitted at a higher frequency than the satellite L-band, namely, above 1.55 gigahertz, in a high band 320. The high band 320 may be associated with a bandwidth of approximately two hundred fifty megahertz. Thus, a service provider can fully exploit the L-band without interference caused by the home network. Further, placing the high band 320 above the other frequencies used by a service provider may reduce the likelihood that content, such as downloaded films or television shows, provided by the service provider may be hacked or otherwise stolen by a homeowner.

In spectrum 322, the communication signal associated with the home network is communicated at least partially within the L-band in high band 324. In some embodiments, the high band 324 ranges from approximately one gigahertz to approximately 1.5 gigahertz. For example, the high band 324 may range from approximately 1.2 gigahertz and 1.45 gigahertz. In various embodiments, the high band 324 may use frequencies not lower than 1.1 gigahertz, 1.2 gigahertz, 1.3 gigahertz, 1.4 gigahertz, 1.5 gigahertz, 1.6 gigahertz, 1.7 gigahertz, 1.8 gigahertz, 1.9 gigahertz and 2.0 gigahertz. Frequency ranges included in some embodiments are described in nonprovisional U.S. patent application Ser. No. 11/536, 539 filed Sep. 28, 2006 and entitled "Multi-Wideband Communications over Powerlines." In some embodiments, the signal transmit in frequency band 318 and/or the signal transmit in high band 324 may be encrypted or otherwise protected.

In spectrum 326, if frequency band 316 associated with television broadcasts, cable television, and digital television, is not being used, the communication signal associated with the home network is communicated at least partially within frequency band 328. At least a portion of the frequency band 328 includes frequencies between 50 MHz and 300 MHz.

The following FIGS. 4-8 and 10-12 depict various embodiments of multi-network interface device 200. The depicted embodiments support communications via a powerline and a telephone line, and via a powerline and a coaxial cable. It is understood that these embodiments may be modified by those skilled in the art to support communications over any combination of the three mediums. Further, a multi-network interface device 200 may support communications via a telephone line and a coaxial cable, but not a powerline. The embodiments shown may comprise one or more integrated circuit.

Figure 4:
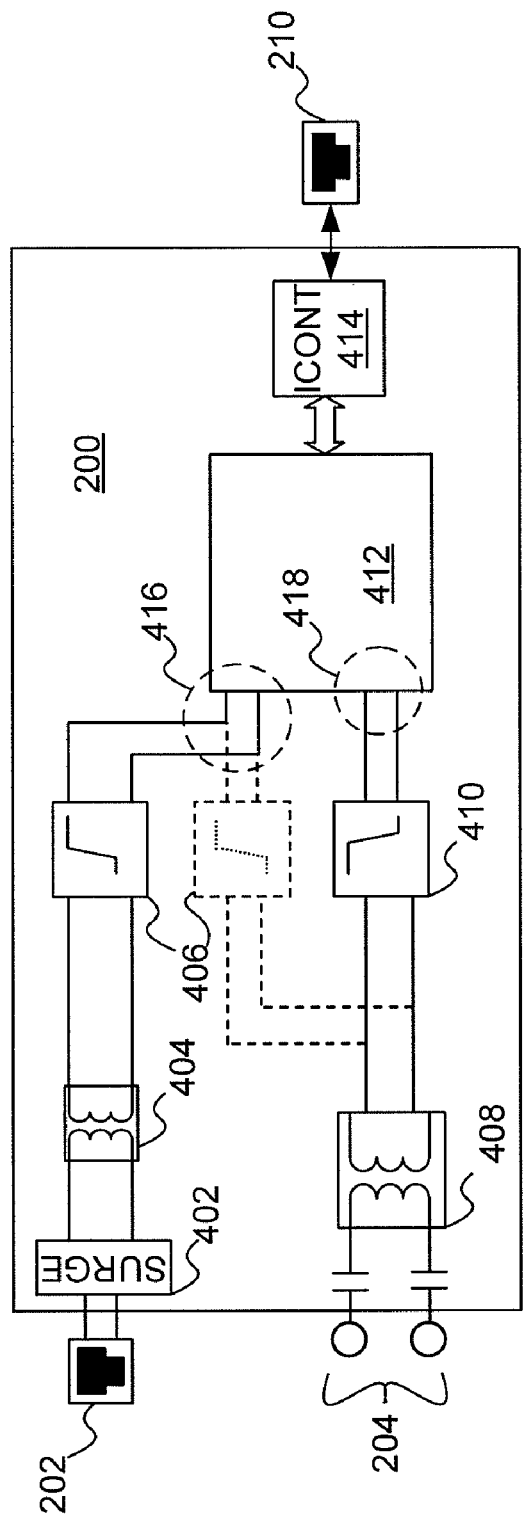
FIG. 4 is a block diagram of a first circuit embodiment of the multi-network interface device, according to various embodiments.

FIG. 4 is a block diagram of a first circuit embodiment of the multi-network interface device 200. In this embodiment, the multi-network interface device 200 is configured to provide communications interfaces for a powerline and a telephone line. A communication may be received and/or transmitted via the telephone line interface 202 and/or the powerline interface 204. In some embodiments, the telephone line is passively shared with prior art telephone signals. The multi-network interface device 200 processes a communications signal received through the telephone line interface 202 and/or powerline interface 204 and provides a resulting output signal via an optional Ethernet interface 210, and vice-versa. Ethernet interface 210 is optionally coupled to a network apparatus such as a television set, DVD player, media player, personal computer, speaker, stereo, video game console, personal digital assistant, or the like. Alternatively, the multi-network interface device 200 may receive the communications signal from one of the telephone line interface 202 or the powerline interface 204 and transmit the communications signal via the other telephone line interface 202 or the power-line interface 204. In embodiments configured to communicate on both a powerline and a telephone line, the telephone line may be used to provide redundancy in a mesh or ad-hoc network.

In one embodiment, a signal is communicated via the telephone line interface 202. These signals may be communicated in the high band 306. The signal path from the telephone line interface 202 to the Ethernet interface 210 comprises a surge protector 402, an inductive coupler 404, a high pass filter 406, a network processor 412, and a host interface controller 414. The high pass filter 406 may allow only frequencies above approximately thirty megahertz to pass. The surge protector 402, the inductive coupler 404, and the high pass filter 406 collectively provide signal communications without significantly impacting services existing on lower frequencies.

In some embodiments, a signal is communicated via the powerline interface 204. The signal may be communicated via the low band 304 and/or the high band 306. The signal path from the powerline interface 204 to the Ethernet interface 210 comprises an inductive coupler 408, and, depending on the frequency band of the signal, the high pass filter 406 and/or a low pass filter 410. Like the signal path associated with the telephone line interface 202, the inductive coupler 408, the high pass filter 406 and the low pass filter 410 collectively provide signal communications without significantly impacting prior art signals at lower frequencies. In some embodiments, the powerline interface 204 may not be configured to communicate via the high band 306. In these embodiments, the high pass filter 406 is optional.

In some embodiments, the network processor 412 and the host interface controller 414 are shared by the signal paths associated with the powerline interface 204 and the telephone line interface 202. The network processor 412 comprises processing circuitry to remove noise, amplify the signal, and/or convert an analog signal to a digital signal or vice-versa. The network processor 412 may comprise two or more analog front ends (AFE). One of the AFEs is configured to receive and/or transmit a communications signal on the high band 206 and the other of the AFEs is configured to receive and/or transmit a communications signal on the low band 304. In the embodiment shown, a communication signal received via the high band 306 passes through the high pass filter 406 and a high frequency AFE 416, and a communication signal received via the low band 304 passes through the low pass filter 410 and a low frequency AFE 418.

The network processor 412 may further comprise a line driver, programmable gain amplifier, an analog-to-digital converter, and/or a digital-to-analog converter. Possible configurations of the network processor 412 are described in greater detail in nonprovisional U.S. patent application Ser. No. 11/536,539 filed Sep. 28, 2006 and entitled "Multi-Wideband Communications over Powerlines." Logic within the network processor may determine whether to transmit a communication signal via a certain communications interface based on a quality of service metric of the communications network or a purpose of the communication signal. The network processor 412 may be compatible with the HomePlug AV standard or other standards associated with powerline communications, telephone line communications, or coaxial cable communications. Network processor 412 is optionally configured to process prior art telephone signals, e.g., if the multi-network interface device 200 is included in a telephone.

The host interface controller (ICONT) 414 allows for communication of data between the Ethernet interface 210 and the network processor 412. For example, the ICONT 414 may implement an Ethernet controller as specified by IEEE 802.3. To illustrate, the ICONT 414 includes the Physical and Data Link layers as defined in the seven layer OSI reference model for standardizing computer-to-computer communications. Additionally, ICONT 414 may implement a TCP/IP stack that includes the Network, Transport and Application layers of the OSI reference model. The multi-network interface device 200 may receive power via the powerline interface 204. ICONT 414 is optionally included within network processor 412, host interface PCI driver, or the like.

Figure 5:
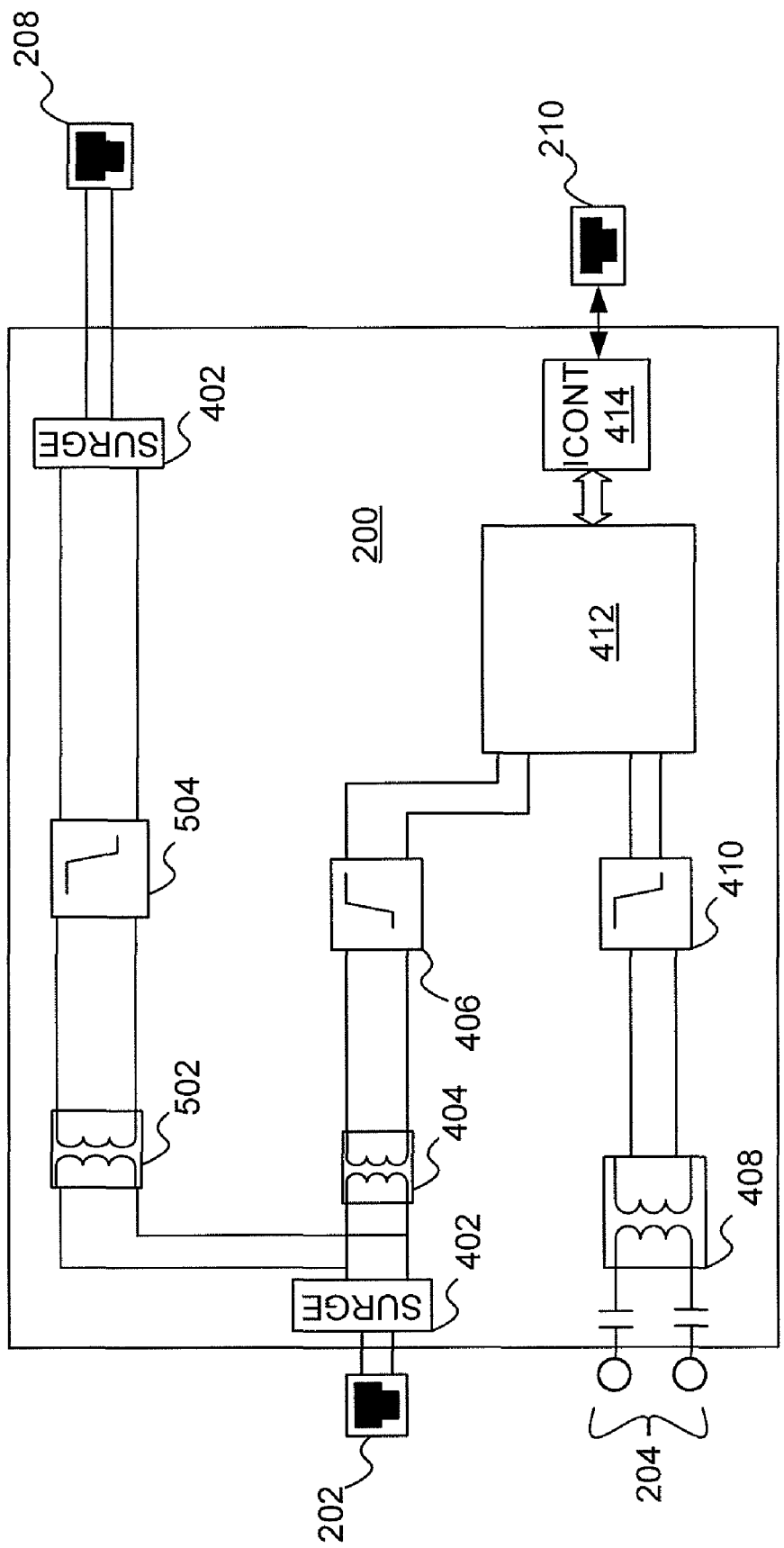
FIG. 5 is a block diagram of a second circuit embodiment of the multi-network interface device, according to various embodiments.

FIG. 5 is a block diagram of a second embodiment of the multi-network interface device 200. In this embodiment, the multi-network interface device 200 is configured to communicate a first signal via the low band 304 over a powerline and to communicate a second signal via the high band 306 over a telephone line. The multi-network interface device 200 additionally comprises a second telephone line interface 208. The second telephone line interface 208 may be used to communicate voice, ADSL, VDSL, or HPNA signals within band 310.

To allow communication between the telephone line interface 202 and the second telephone line interface 208, an optional second inductive coupler 502 may be placed between the surge protector 402 and the inductive coupler 404. The second inductive coupler 502 is coupled to an optional low pass filter 504 to isolate the signal within the band 310 from other communications signals communicated within the high band 306. The low pass filter 504 may pass frequencies below approximately thirty megahertz. Another surge protector 402 may be placed between the low pass filter 504 and the second telephone line interface 208. A user may connect a non-network apparatus such as a telephone, DSL modem, or the like to the second telephone line interface 208. In alternative embodiments, the first telephone line interface 202 and the second telephone line interface 208 are connected by a direct pass-through connection.

Figure 6:
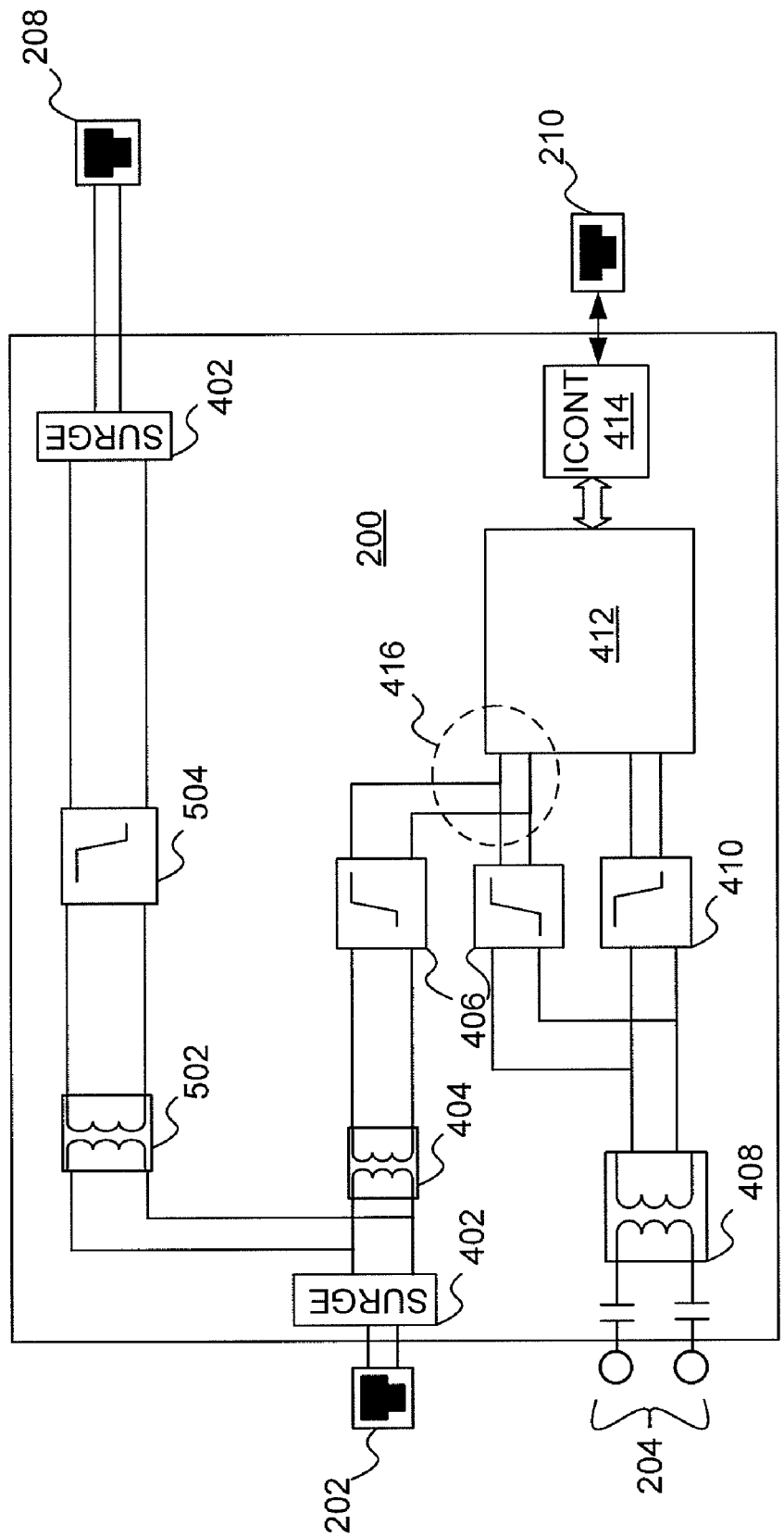
FIG. 6 is a block diagram of a third circuit embodiment of the multi-network interface device, according to various embodiments.

FIG. 6 is a block diagram of a third embodiment of a multi-network interface device 200. In this embodiment, the multi-network interface device 200 is configured to communicate a first signal via the low band 304 over a powerline, to communicate a second signal via the high band 306 over the powerline, and optionally to communicate the second signal or a third signal via the high band 306 over a telephone line. The multi-network interface device 200 comprises a second telephone interface 208 from which a fourth signal, in band 310, may be communicated as discussed in connection with FIG. 5.

The multi-network interface device 200 comprises a network processor 412 having a single high frequency AFE 416 configured to receive or transmit signals communicated via the high band 306 over both the powerline and the telephone line. The single high frequency AFE 416 optionally includes passive sharing of the powerline and the phone line. As such, the single high frequency AFE 416 can only receive or only transmit one signal at any one time.

Figure 7:
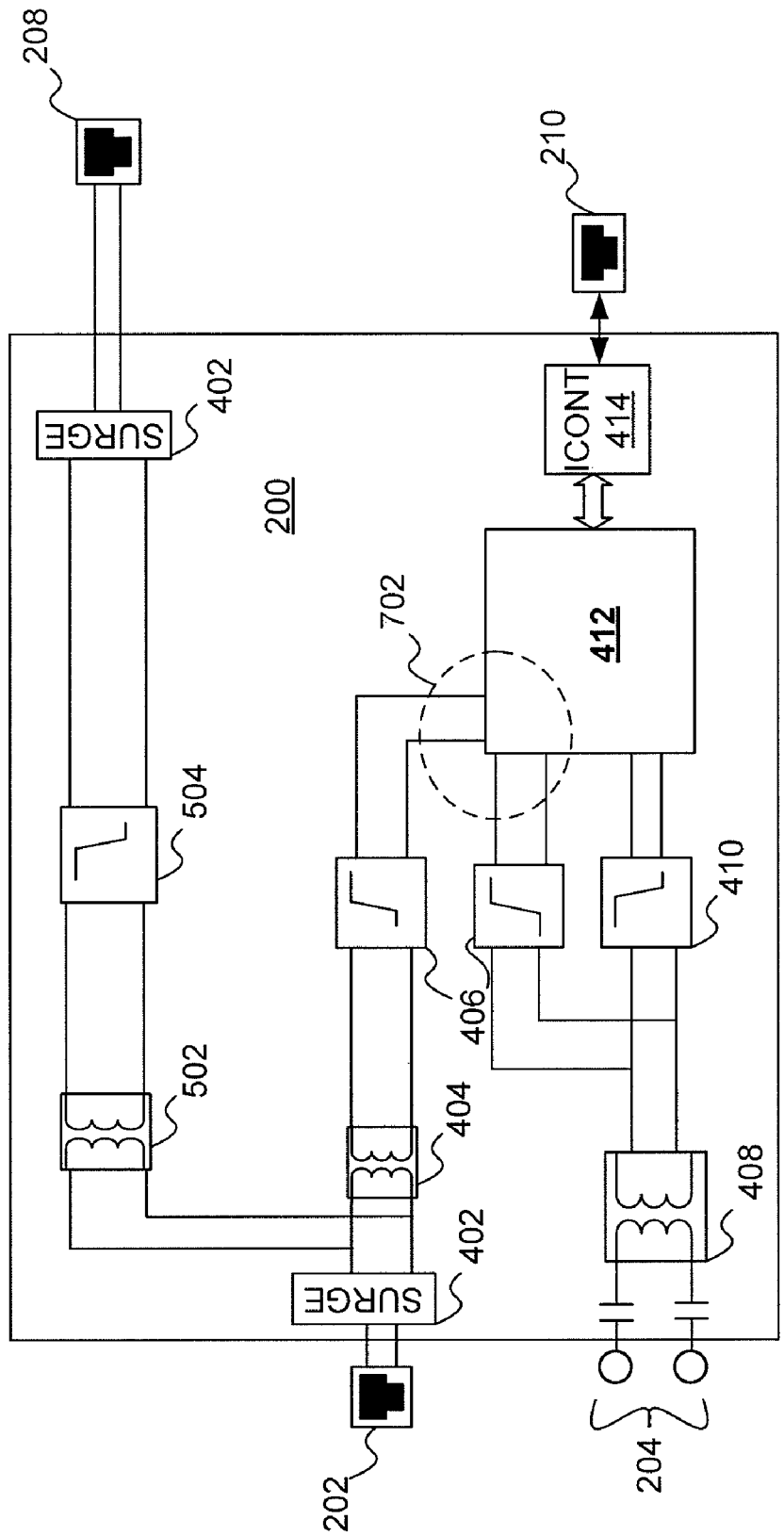
FIG. 7 is a block diagram of a fourth circuit embodiment of the multi-network interface device, according to various embodiments.

FIG. 7 is a block diagram of a fourth embodiment of the multi-network interface device 200. The embodiment of multi-network interface device 200 illustrated in FIG. 7 is substantially similar to the multi-network interface device 200 illustrated in FIG. 6 except for a dual high frequency AFE 702. The dual high frequency AFE 702 includes two separate inputs configured to independently and simultaneously communicate signals in the high band 306 and through both the telephone line interface 202 and the powerline interface 204.

Figure 8:
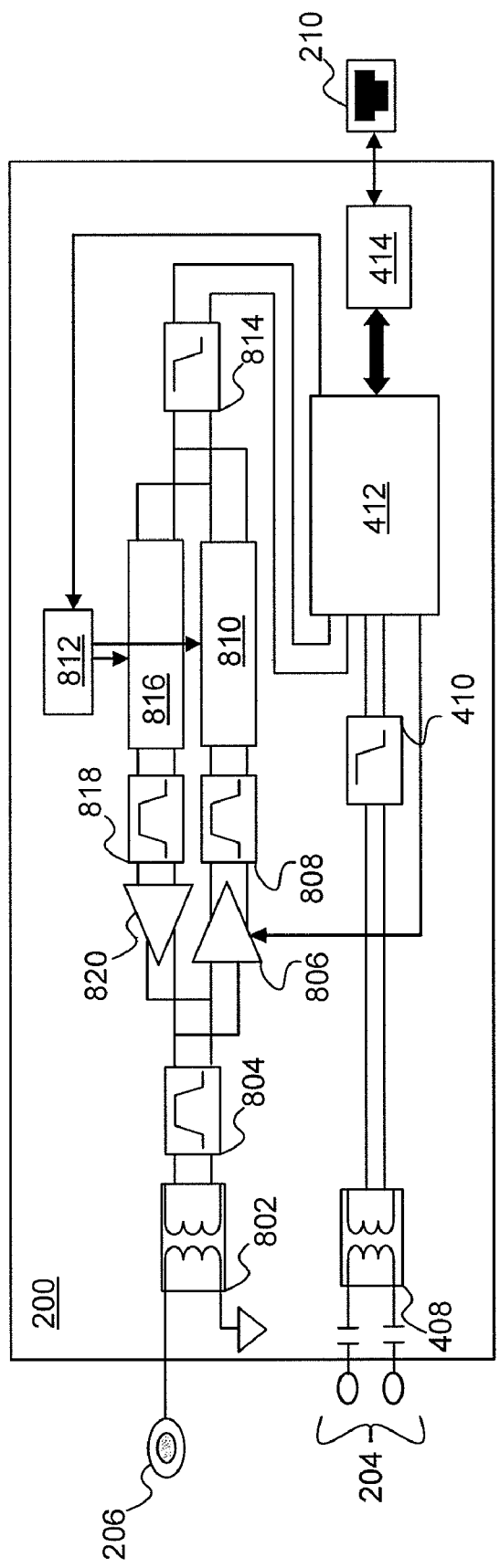
FIG. 8 is a block diagram of a fifth circuit embodiment of the multi-network interface device, according to various embodiments.

FIG. 8 is a block diagram of a fifth embodiment of the multi-network interface device 200. In this embodiment, the multi-network interface device 200 is configured to communicate between an optional Ethernet interface 210, a powerline interface 204, and a coaxial cable interface 206. The communication may pass between any two or all three of these interfaces. For example, the multi-network interface device 200, as shown, may communicate over a powerline using the low band 304 and over coaxial cable using either band 320 or band 324. In other embodiments, the powerline signal path may be configured to support communications over the high band 306. The multi-network interface device 200 may support communications between the power line interface 204 and the coaxial cable interface 206. The signal path from the powerline interface to the Ethernet interface 210 is further discussed herein, for example, in connection with FIG. 4.

The signal path from the coaxial cable interface 206 comprises an inductive coupler 802, a band pass filter 804, a receiving signal path, and transmitting signal path, a local oscillator 812, a low pass filter 814, the network processor 412, and the ICONT 414. From the ICONT 414, the signal may be communicated to the Ethernet interface 210 and/or the powerline interface 204. The receiving signal path comprises a low noise amplifier 806, a band pass filter 808, and an optional down converter mixer 810. The transmitting signal path comprises an optional up converter mixer 816, a band pass filter 818, and a programmable amplifier 820. The network processor 412 and the ICONT 414 may be shared with the powerline signal path.

The coaxial cable may carry signals at frequencies above one gigahertz, as described herein, for example, in connection with FIG. 3. The network processor 412 may be configured to process signals having frequencies within low band 304 and high band 306. Therefore, these signals may be shifted between the high band 306 and the high band 320 or the high band 324 along the coaxial cable signal path using the up converter mixer 816 or the down converter mixer 310, respectively. In some embodiments, clock error on the coaxial cable may be communicated over the powerline using the powerline interface 204 The inductive coupler 802 and the band pass filter 804 collectively enable signal communications without impacting prior art services on lower frequencies.

The low-noise amplifier 806 may amplify a signal received via the coaxial cable interface 206 based on a control signal received from the network processor 412. The signal may then pass through an optional second band pass filter 808 before entering the down converter mixer 810. The down converter mixer 810 is controlled by the local oscillator 812, which is, in turn, controlled by the network processor 412. The down converter mixer 810 is configured, based on the received signal, to generate two lower frequency sidebands. The low pass filter 814 passes one of the two lower frequency sidebands. The passed lower frequency sideband is then processed by the network processor 412.

An output signal from the network processor 412 via the coaxial cable interface 206 optionally passes through the low pass filter 814, the up converter mixer 816, a band pass filter 818, and a programmable gain amplifier 820. The up converter mixer 816 is controlled by the local oscillator 812 and generates two side bands. The band pass filter 818 isolates one of the sidebands for transmission via the coaxial cable. The isolated sideband may be selected based on the presence or absence of satellite L-band signals on the coaxial cable. The isolated sideband is then amplified by programmable amplifier 820. The signal passes through the band pass filter 804 and the inductive coupler 802 upon leaving the transmission path.

Figure 9:
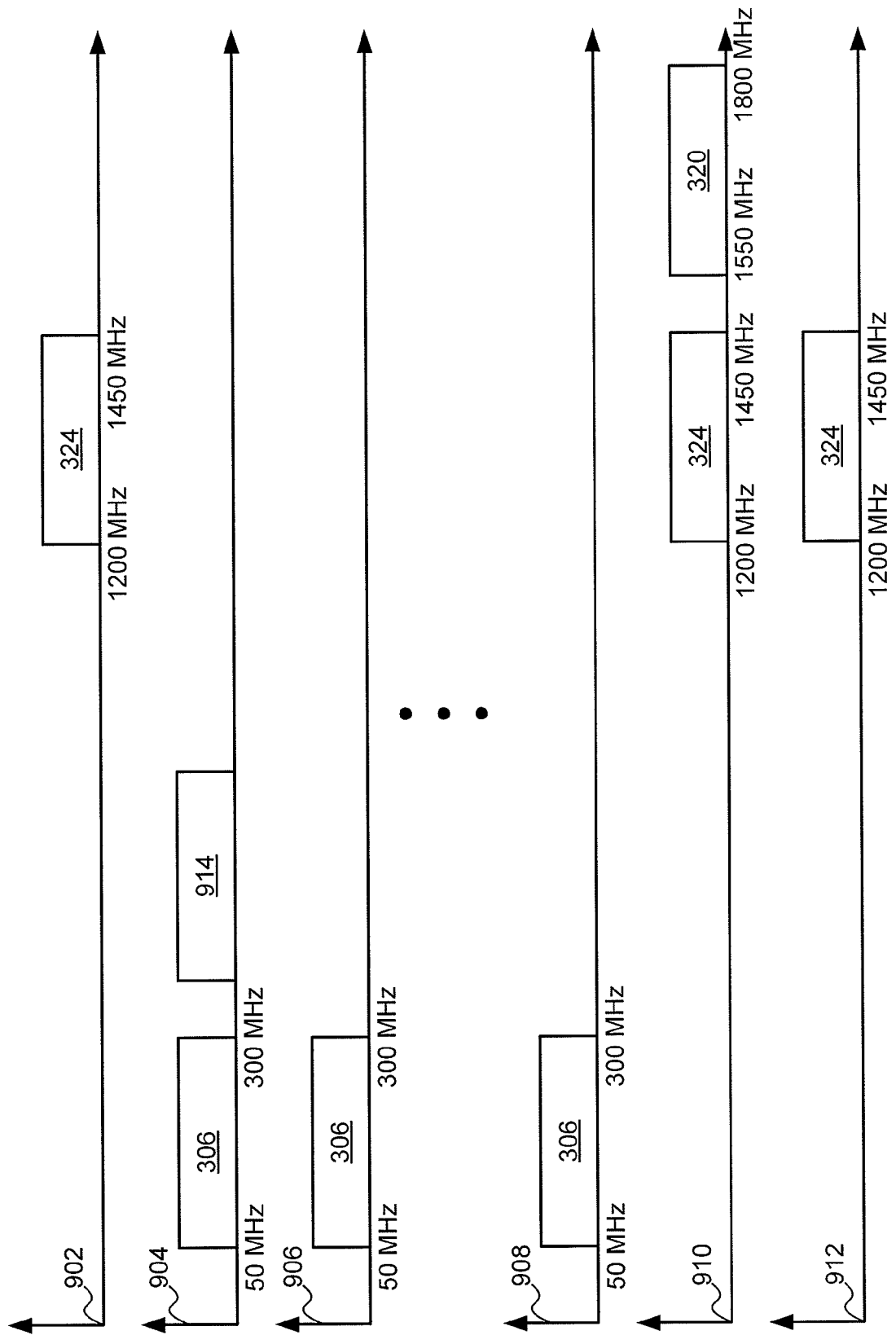
FIG. 9 depicts the frequency characteristics of a frequency band associated with the signal used by the fifth integrated circuit embodiment depicted in FIG. 8, according to various embodiments.

FIG. 9 depicts frequency bands associated with the signal used by the fifth integrated circuit embodiment 200 depicted in FIG. 8, according to various embodiments when the signal is communicated via the coaxial cable. Spectra 902, 904, and 906 depict frequency characteristics of a signal received by the multi-network interface device 200 along the receiving signal path. Spectra 908, 910, and 912 depict frequency characteristics of the signal transmitted by the multi-network interface device 800 along the transmitting signal path. In the embodiment shown, the signals are communicated via the coaxial cable using high band 324. In other embodiments, the signals may be received and/or transmitted over high band 320.

In spectra 902, a signal within the high band 324 is received by the coaxial cable interface 206. In the receiving signal path, the down converter mixer 810 generates two sidebands, in the high band 306 and in another band 914, based on the received signal as depicted in spectra 904. At least one of these sidebands may be within high band 306 or low band 304. In spectra 904, the lower frequency sideband is shown to be within high band 306. The low pass filter 814 isolates the sideband in high band 306 shown in spectrum 906, which can be processed by network processor 412.

To transmit a signal via the coaxial cable interface 206, the network processor 412 generates the signal in the high band 306, as shown in spectrum 908. The up converter mixer 816 generates two side bands from the generated signal as shown in spectrum 910. In the embodiment shown, at least one of these sidebands is within high bands 320 and 324 as described herein, at least, in connection with FIG. 3. Other embodiments may generate sidebands in other frequencies. The sideband, e.g. in band 324, to be transmitted via the coaxial cable interface 206 is isolated, as shown in spectrum 912, using the band pass filter 818. In alternative embodiments, network processor 412 is configured to directly process and/or generate signals in the high band 324 and/or the high band 320.

In further embodiments, the multi-network interface device 200 may comprise a communications interface is associated with a second media access control address. In these embodiments, the multi-network interface device 200 may comprise a router or switch. The router may access a router table to route communications and/or messages to an appropriate MAC address.

Figure 10:
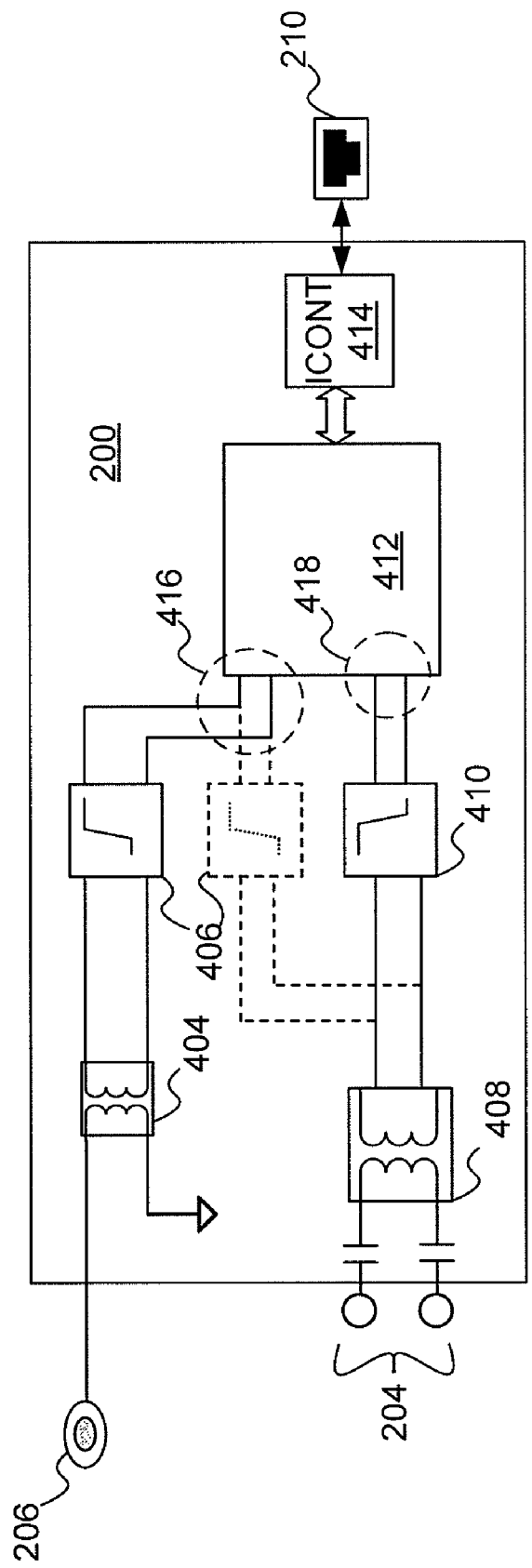
FIG. 10 is a block diagram of a sixth circuit embodiment of the multi-network interface device, according to various embodiments.

FIG. 10 is a block diagram of a sixth circuit embodiment of the multi-network interface device 200, according to various embodiments. In this embodiment, the multi-network interface device 200 is configured to communicate between an optional host interface 216, a powerline interface 204, and a coaxial cable interface 206. The multi-network interface device may communicate via the powerline and/or the host interface 216 as described herein, at least, in connection with FIG. 4. Further, the coaxial cable interface 206 may communicate signals within the frequency band 328 described herein, at least, in connection with FIG. 3. According to these embodiments, the high pass filter 406 may isolate the signals in frequency band 328 from those present on the coaxial cable in band 314.

Figure 11:
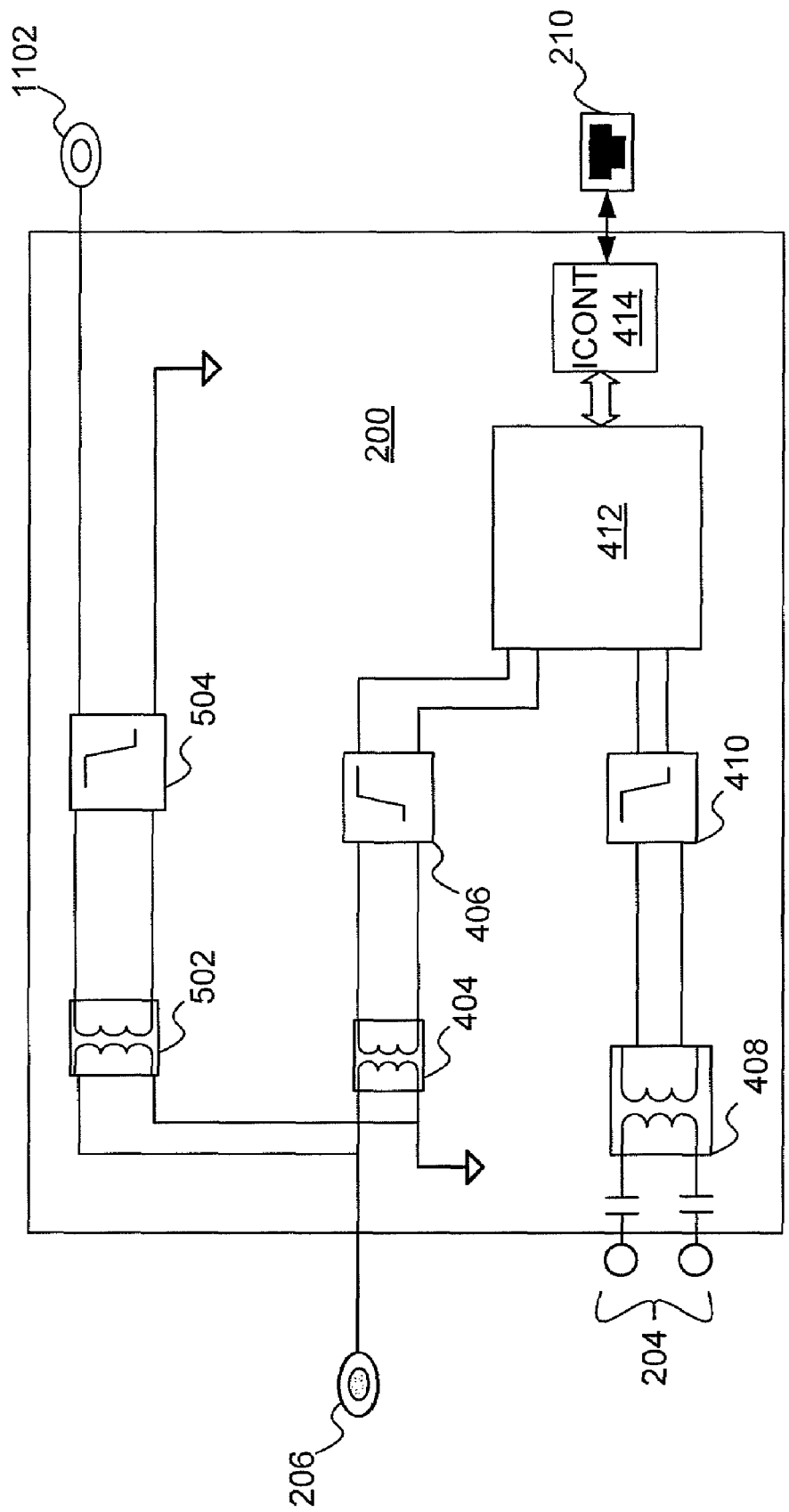
FIG. 11 is a block diagram of a seventh circuit embodiment of the multi-network interface device, according to various embodiments.

FIG. 11 is a block diagram of a seventh circuit embodiment of the multi-network interface device 200, according to various embodiments. In this embodiment, the multi-network interface device 200 is configured to communicate between an optional host interface 216, a powerline interface 204, and a coaxial cable interface 206. The multi-network interface device may communicate via the powerline and/or the host interface 216 as described herein, at least, in connection with FIG. 5. Further, the coaxial cable interface 206 may communicate signals within the frequency band 328 described herein, at least, in connection with FIG. 3. The multi-network interface device 200 additionally comprises a second coaxial cable interface 1102. The second coaxial line interface 208 may be used to communicate voice, ADSL, VDSL, or HPNA signals within band 314.

Figure 12:
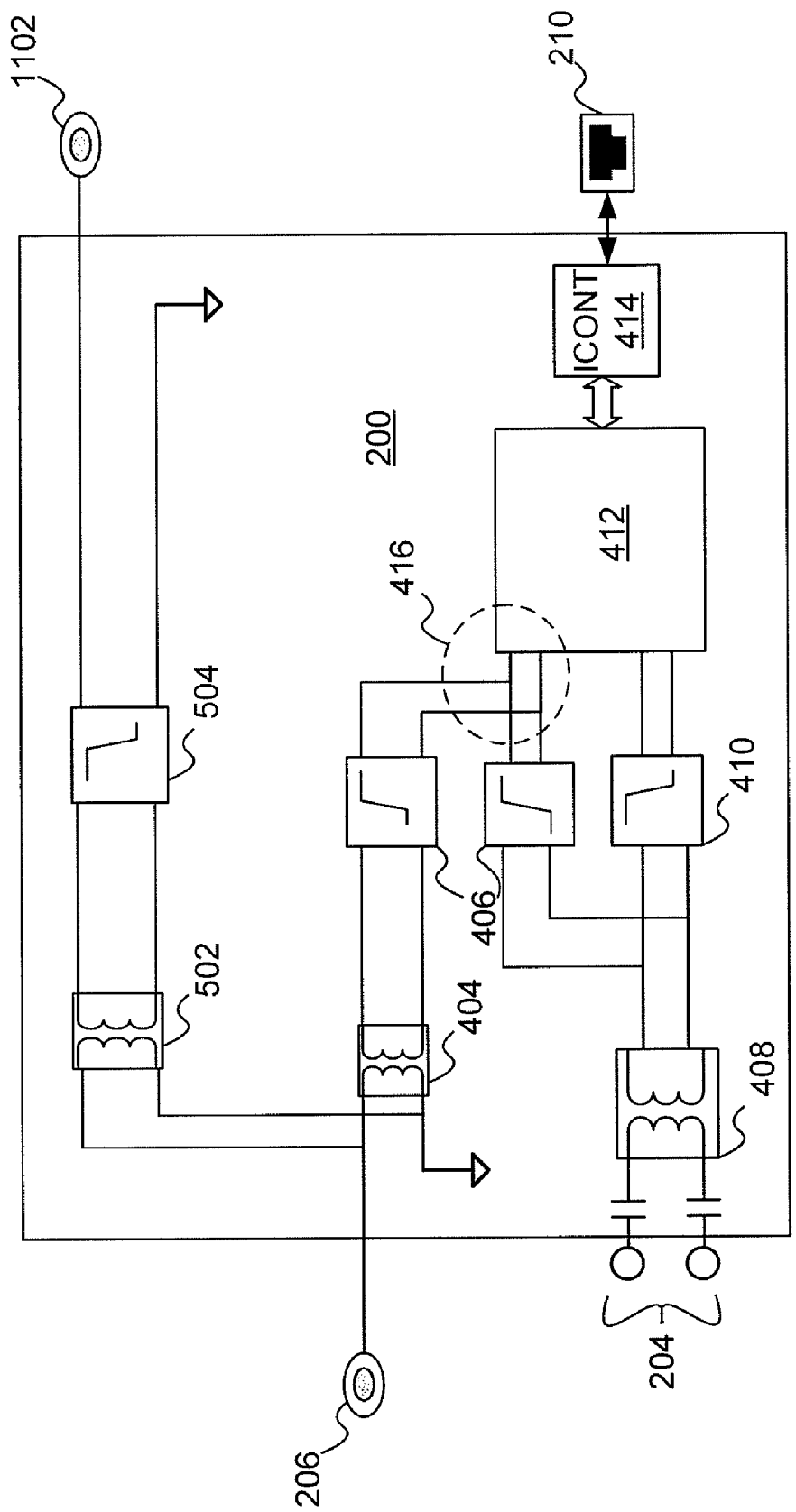
FIG. 12 is a block diagram of an eighth circuit embodiment of the multi-network interface device, according to various embodiments.

FIG. 12 is a block diagram of an eighth circuit embodiment of the multi-network interface device 200, according to various embodiments. In this embodiment, the multi-network interface device 200 is configured to communicate a first signal via the low band 304 over a powerline, to communicate a second signal via the high band 306 over the powerline, and optionally to communicate the second signal or a third signal via the frequency band 328 over a coaxial cable. The multi-network interface device may communicate via the powerline and/or the host interface 216 as described herein, at least, in connection with FIG. 6. Further, the coaxial cable interface 206 may communicate signals within the frequency band 328 described herein, at least, in connection with FIG. 3. The multi-network interface device 200 additionally comprises a second coaxial cable interface 1102. The second coaxial line interface 208 may be used to communicate voice, ADSL, VDSL, or HPNA signals within band 314.

Figure 13:
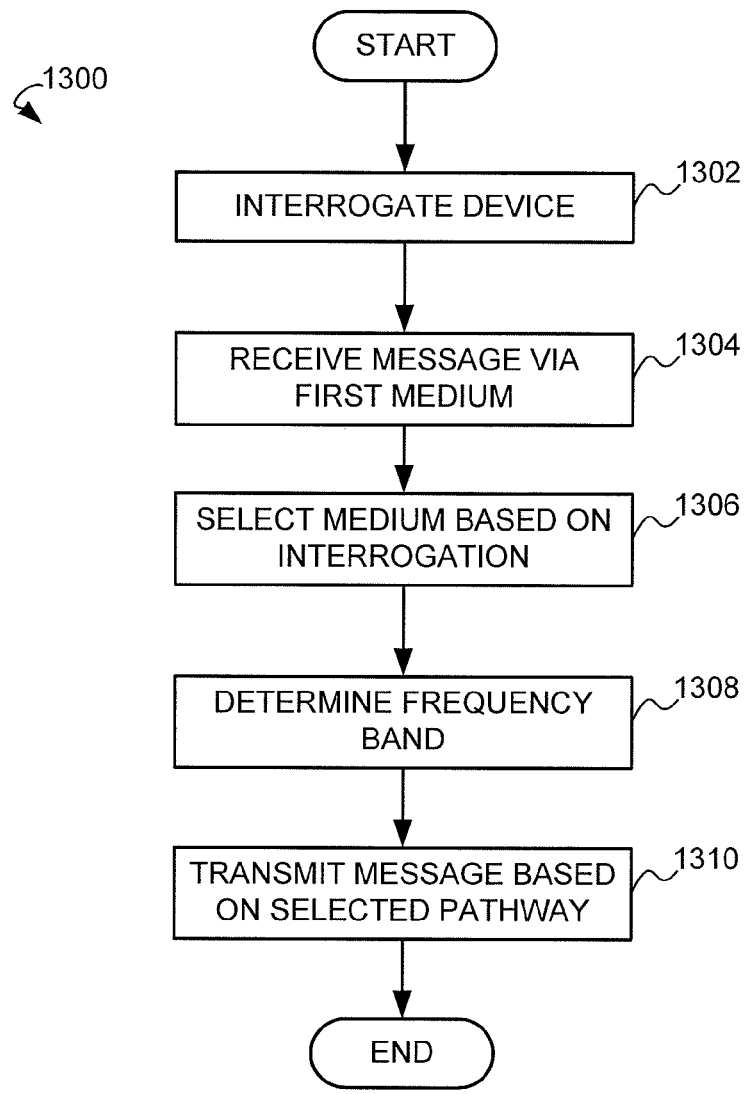
FIG. 13 is a flowchart depicting an exemplary method for communicating within a network, according to various embodiments.

FIG. 13 is a flowchart depicting an exemplary method 1300 for communicating within a network, according to various embodiments. In this method, a multi-network interface device 200 may become known to, and communicate with, other network devices within a communications network. These other network devices may be further instances of multi-network interface device 200 or other network devices known in the art. In some embodiments, the multi-network interface device 200 may act as a repeater in the network and/or otherwise forward messages to the other network devices via the method 1300.

In a step 1302, the multi-network interface device 200 interrogates the communications network by sending and receiving data packets. The powerline interface 204, telephone line interface 202, and/or the coaxial cable interface 206 may be used to send and receive these data packets. The interrogation may, in some embodiments, be initiated by network service provider such as a cable provider. The interrogation may be configured to determine, for example, types of network devices connected to the communications network, MAC addresses associated with these network devices, which mediums and frequency bands may be used to communicate with each of these network devices, possible bandwidths, and/or the like.

The interrogation may include obtaining one or more quality of service (QoS) metric. These QoS metrics may be associated with specific media and/or specific frequency bands. For example, in some instances multi-network interface device 200 may be able to communication with another network device through more than one media and/or using more than one frequency band. The QoS metric may be used to determine which media and/or which frequency bands are preferred for communicating with specific network devices.

In a step 1304, a message is received by the multi-network interface device 200 from another network device or from the Ethernet interface 210. The message may be received via an Ethernet cable, the powerline, the telephone line, or the coaxial cable. For example, the message may comprise a request for communications, or a video data signal sent from a DVD player to a television.

In step 1306, a pathway and associated medium for forwarding the message received in step 1304 to another network device is selected. This selection may be based on a QoS requirement, the type of network device to which the message is to be forwarded to, a communication interface associated with the network device, and/or a bandwidth requirement of the message to be sent. This selection may further use information gathered in step 1302. For example, bandwidths and QoS metrics determined in step 1302 may be compared with bandwidth and QoS requirements.

More than one medium is optionally selected in step 1306. For example, it may be determined that data can be sent via both telephone interface 202 and powerline interface 204 in parallel to achieve a required bandwidth. Alternatively, it may be determined that command and control signals may be sent via powerline interface 204 while high bandwidth video data can be sent via telephone interface 202 and/or a different frequency band of the powerline interface 204.

In step 1306, the multi-network interface device 200 may select a pathway to a destination. This selection may be made, for example, to avoid passage through a junction box or other pathway associated with a low QoS metric. As such, the selected pathway may include transmitting the received message via the telephone line interface 202 or coaxial cable interface 206, rather than the power line interface 204.

In a step 1308, specific frequency bands associated with the media selected in step 1306 are selected for transmitting the message. For example, if the selected media includes a power line coupled to power line interface 204, then the low band 304 and/or the high band 306 may be selected in step 1308. If the selected media includes a coaxial cable coupled to the coaxial cable interface 206, then the frequency bands 320 and/or 324 may be selected. The selection of frequency bands is typically made based on criteria similar to the criteria used to select media in step 1306. For example, the selection may be made based on comparisons of bandwidth and QoS requirements with metrics determined in step 1302. More than one frequency band may be selected in step 1308. In some embodiments, steps 1306 and 1308 are combined into a single step.

In a step 1310, the message is transmitted via the selected media selected in step 1306 and the frequency bands selected in step 1308. The transmission may include using an alternative medium (e.g., the telephone line) and/or shifting the message into another frequency band (e.g., from low band 304 to high band 306).

Figure 14:
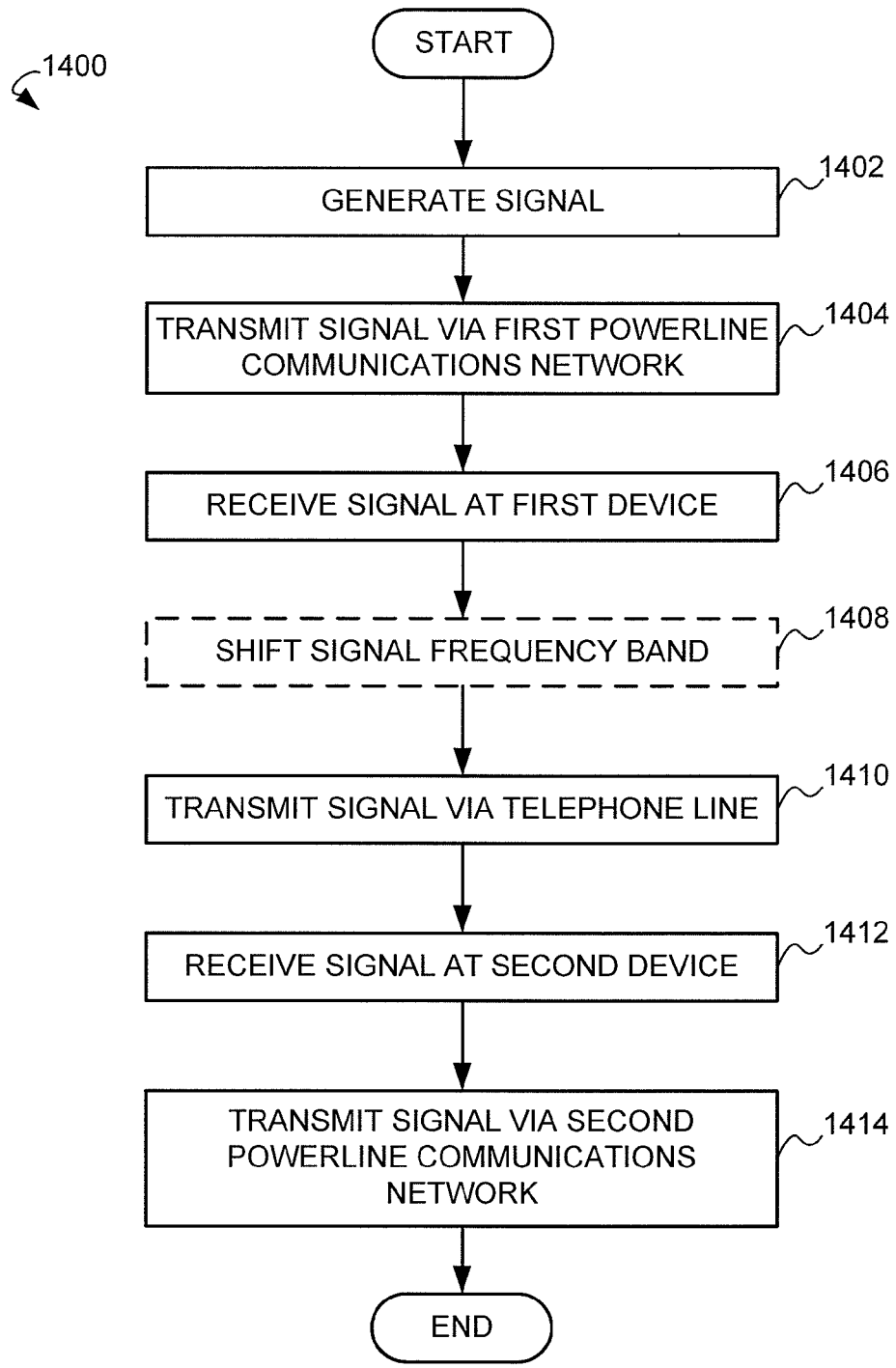
FIG. 14 is a flowchart depicting an exemplary method for bridging between mediums, according to various embodiments.

FIG. 14 is a flowchart depicting an exemplary method 1400 for bridging between mediums, according to various embodiments. In some embodiments, bridging between mediums may be performed when there is a section of the network having a low QoS. To bridge mediums, two or more devices communicate the signal across multiple mediums. For example, in some communications networks using a powerline communications network, passing a signal through a junction box to traverse between sections of mains cable is difficult. Therefore, another medium may be used as a bridge between multiple sections of mains cable.

In a step 1402, a signal is generated. The signal is associated with one or more destinations. In a step 1404, the signal is transmitted via a first powerline communications network to a first multi-network interface device 200. The first multi-network interface device 200 may be connected to a first section of mains cable. In step 1406, the signal is received at the first multi-network interface device 200.

In an optional step 1408, the signal is shifted into another frequency band for transmission via the telephone line or coaxial cable. In a step 1410, the signal is transmit from the first multi-network interface device 200 via the telephone line or coaxial cable to a second multi-network interface device 200. In a step 1412, the signal is received at the second multi-network interface device 200 via the telephone line or coaxial cable. The second device may be connected to, for example, a second section of mains cable separated from the first section of mains cable by a junction box. In a step 1414, the signal is transmitted via the second powerline communications network. The signal may be modified in frequency or content by the first or second multi-network interface device 200.

Several embodiments are specially illustrated and/or described herein. However, it will be appreciated that modification and variations are covered by the above teachings and within the scope of the appended claims without departing from the spirit and intended scope thereof. For example, the techniques described herein may be used in household, commercial, civic, industrial and/or vehicle power systems. Further, various embodiments may be embodied in firmware, hardware, and/or software (stored on a computer readable media), executable by a processor. These element forms are generally referred to as "logic."

In some embodiments, one of the communications interfaces included in multi-network interface device 200 may be configured to communicate over a wireless network, such as a WiFi network, and comprise a wireless network antenna. According to various embodiments, the multi-network interface device 200 may include a transformer configured to transform AC power received via the powerline to DC power (e.g., 5V, 12V, or 24V) to power a network apparatus. In these embodiments, the multi-network interface device 200 includes an AC/DC converter. In various embodiments, Ethernet interface 210 may be replaced by another computer interface such as a universal serial bus interface, a parallel port interface, a Peripheral Component Interconnect (PCI) interface, an Accelerated Graphics Port (AGP), a wireless interface, and/or other industry standard data interface.

Some embodiments of the multi-network interface device 200 include external devices that comprise two interfaces configured to communicate via two types of mediums. These devices may or may not include a bypass as described herein, at least, in connection with FIG. 5.

One embodiment comprises interfaces configured to communicate via the powerline on a low band and via a telephone line on a high band to one or more host interfaces configured to communicate using Ethernet 10/100/1000, WiFi, UWB, Wireless USB, USB2.0, Firewire, or the like. One embodiment comprises interfaces configured to communicate via the powerline on a low band, via the powerline on a high band and via a telephone line on a high band to one or more host interfaces configured to communicate using Ethernet 10/100/1000, WiFi, UWB, Wireless USB, USB2.0, Firewire, or the like.

One embodiment comprises interfaces configured to communicate via the powerline on a low band and via a coaxial cable on a high band to one or more host interfaces configured to communicate using Ethernet 10/100/1000, WiFi, UWB, Wireless USB, USB2.0, Firewire, or the like. One embodiment comprises interfaces configured to communicate via the powerline on a low band, via the powerline on a high band, and via a coaxial cable on a high band to one or more host interfaces configured to communicate using Ethernet 10/100/1000, WiFi, UWB, Wireless USB, USB2.0, Firewire, or the like.

One embodiment comprises interfaces configured to communicate via the powerline on a low band and via a coaxial cable on a high band using a mixer as described herein, at least, in connection with FIG. 8 to one or more host interfaces configured to communicate using Ethernet 10/100/1000, WiFi, UWB, Wireless USB, USB2.0, Firewire, or the like. One embodiment comprises interfaces configured to communicate via the powerline on a low band, via the powerline on a high band, and via coaxial cable on a high band using a mixer as described herein, at least, in connection with FIG. 8 to one or more host interfaces configured to communicate using Ethernet 10/100/1000, WiFi, UWB, Wireless USB, USB2.0, Firewire, or the like.

Some embodiments of the multi-network interface device 200 include external devices that comprise three interfaces configured to communicate via three types of mediums. These devices may or may not include a bypass as described herein, at least, in connection with FIG. 5.

One embodiment comprises interfaces configured to communicate via the powerline on a low band, via a telephone line on a high band, and via a coaxial cable on a high band to one or more host interfaces configured to communicate using Ethernet 10/100/1000, WiFi, UWB, Wireless USB, USB2.0, Firewire, or the like. One embodiment comprises interfaces configured to communicate via the powerline on a low band, via the powerline on a high band, via a telephone line on a high band, and via a coaxial cable on a high band to one or more host interfaces configured to communicate using Ethernet 10/100/1000, WiFi, UWB, Wireless USB, USB2.0, Firewire, or the like. One embodiment comprises interfaces configured to communicate via the powerline-on a low band, via the powerline on a high band, via a telephone line on a high band, and via a coaxial cable on a high band using a mixer as described herein, at least, in connection with FIG. 8 to one or more host interfaces configured to communicate using Ethernet 10/100/1000, WiFi, UWB, Wireless USB, USB2.0, Firewire, or the like.

Some embodiments of the multi-network interface device 200 include embedded devices that comprise two interfaces configured to communicate via two types of mediums. These devices may or may not communicate over mediums that also have signals for other services in other frequency bands. Examples of these services include DOCSIS, Cable TV, or the like in a coaxial cable modem and/or DSL, Voice, or the like in a DSL Home Gateway device.

One embodiment comprises interfaces configured to communicate via the powerline on a low band and via a telephone line on a high band to one or more host interfaces such as MII, GMII, PCI, MiniPCI, PCI-X, PCIe, Host Processor Interface, SPI, UART, or the like. One embodiment comprises interfaces configured to communicate via the powerline on a low band, via the powerline on a high band, and via a telephone line on a high band to one or more host interfaces such as MII, GMII, PCI, MiniPCI, PCI-X, PCIe, Host Processor Interface, SPI, UART, or the like.

One embodiment comprises interfaces configured to communicate via the powerline on a low band and via a coaxial cable on a high band to one or more host interfaces such as MII, GMII, PCI, MiniPCI, PCI-X, PCIe, Host Processor Interface, SPI, UART, or the like. One embodiment comprises interfaces configured to communicate via the powerline on a low band, via the powerline on a high band, and via a coaxial cable on a high band to one or more host interfaces such as MII, GMII, PCI, MiniPCI, PCI-X, PCIe, Host Processor Interface, SPI, UART, or the like.

One embodiment comprises interfaces configured to communicate via the powerline on a low band and via a coaxial cable on a high band using a mixer as described herein, at least, in connection with FIG. 8 to one or more host interfaces such as MII, GMII, PCI, MiniPCI, PCI-X, PCIe, Host Processor Interface, SPI, UART, or the like. One embodiment comprises interfaces configured to communicate via the powerline on a low band, via the powerline on a high band, and via a coaxial cable on a high band using a mixer as described herein, at least, in connection with FIG. 8 to one or more host interfaces such as MII, GMII, PCI, MiniPCI, PCI-X, PCIe, Host Processor Interface, SPI, UART, or the like.

Some embodiments of the multi-network interface device 200 include embedded devices that comprise three interfaces configured to communicate via three types of mediums. These devices may or may not communicate over mediums that also have signals for other services in other frequency bands. Examples of these services include DOCSIS, Cable TV, or the like in a coaxial cable modem and/or DSL, Voice, or the like in a DSL Home Gateway device.

One embodiment comprises interfaces configured to communicate via the powerline on a low band, via a telephone line on a high band, and via a coaxial cable on a high band to one or more host interfaces to one or more host interfaces such as MII, GMII, PCI, MiniPCI, PCI-X, PCIe, Host Processor Interface, SPI, UART, or the like. One embodiment comprises interfaces configured to communicate via the powerline on a low band, via the powerline on a high band; via a telephone line on a high band, and via a coaxial cable on a high band to one or more host interfaces to one or more host interfaces such as MII, GMII, PCI, MiniPCI, PCI-X, PCIe, Host Processor Interface, SPI, UART, or the like.

One embodiment comprises interfaces configured to communicate via the powerline on a low band, via a telephone line on a high band, and via a coaxial cable on a high band using a mixer as described herein, at least, in connection with FIG. 8 to one or more host interfaces to one or more host interfaces such as MII, GMII, PCI, MiniPCI, PCI-X, PCIe, Host Processor Interface, SPI, UART, or the like. One embodiment comprises interfaces configured to communicate via the powerline on a low band, via the powerline on a high band, via a telephone line on a high band, and via a coaxial cable on a high band using a mixer as described herein, at least, in connection with FIG. 8 to one or more host interfaces to one or more host interfaces such as MII, GMII, PCI, MiniPCI, PCI-X, PCIe, Host Processor Interface, SPI, UART, or the like.

Some embodiments of the multi-network interface device 200 include external repeater devices that comprise two or three interfaces configured to communicate via two or three types of mediums. These devices may or may not include a bypass as described herein, at least, in connection with FIG. 5.

One embodiment is configured to repeat signals between the powerline on a low band and the telephone line on a high band. One embodiment is configured to repeat signals between the powerline on a low band, the power line on a high band, and the telephone line on a high band. One embodiment is configured to repeat signals between the powerline on a low band and the coaxial-cable on a high band. One embodiment is configured to repeat signals between the powerline on a low band, the power line on a high band, and the coaxial cable on a high band.

One embodiment is configured to repeat signals between the powerline on a low band and the coaxial cable on a high band using a mixer as described herein, at least, in connection with FIG. 8. One embodiment is configured to repeat signals between the powerline on a low band, the power line on a high band, and the coaxial cable on a high band using a mixer as described herein, at least, in connection with FIG. 8.

One embodiment is configured to repeat signals between the powerline on a low band, the telephone line on a high band, and the coaxial cable on the high band. One embodiment is configured to repeat signals between the powerline on a low band, the power line on a high band, the telephone line on a high band, and the coaxial cable on the high band.

One embodiment is configured to repeat signals between the powerline on a low band, the telephone line on a high band, and the coaxial cable on a high band using a mixer as described herein, at least, in connection with FIG. 8. One embodiment is configured to repeat signals between the powerline on a low band, the power line on a high band, the telephone line on a high band, and the coaxial cable on a high band using a mixer as described herein, at least, in connection with FIG. 8.

Some embodiments of the multi-network interface device 200 comprise two or three network interfaces and a host interface comprising an I2S or Sony/Philips Digital Interconnect Format (SPDIF) compliant interface for transfer of an audio stream.

One embodiment comprises interfaces configured to communicate via the powerline on a low band and the telephone line on a high band to the host interface. One embodiment comprises interfaces configured to communicate via the powerline on a low band, via the powerline on a high band, and the telephone line on a high band to the host interface. One embodiment comprises interfaces configured to communicate via the powerline on a low band and the coaxial cable on a high band to the host interface. One embodiment comprises interfaces configured to communicate via the powerline on a low band, via the powerline on a high band, and the coaxial cable on a high band to the host interface.

One embodiment comprises interfaces configured to communicate via the powerline on a low band, and via the coaxial cable on a high band using a mixer as described herein, at least, in connection with FIG. 8 to the host interface. One embodiment comprises interfaces configured to communicate via the powerline on a low band, via the powerline on a high band, and via the coaxial cable on a high band using a mixer as described herein, at least, in connection with FIG. 8 to the host interface.

One embodiment comprises interfaces configured to communicate via the powerline on a low band, the telephone line on a high band to the host interface, and the coaxial cable on the high band. One embodiment comprises interfaces configured to communicate via the powerline on a low band, via the powerline on a high band, via the telephone line on a high band to the host interface, and via the coaxial cable on a high band.

One embodiment comprises interfaces configured to communicate via the powerline on a low band, via the telephone line on the high band, and via the coaxial cable on a high band using a mixer as described herein, at least, in connection with FIG. 8 to the host interface. One embodiment comprises interfaces configured to communicate via the powerline on a low band, via the powerline on a high band, via the telephone line on the high band, and via the coaxial cable on a high band using a mixer as described herein, at least, in connection with FIG. 8 to the host interface.

The embodiments discussed herein are illustrative of the present invention. As these embodiments of the present invention are described with reference to illustrations, various modifications or adaptations of the methods or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A multi-network interface device comprising:
a powerline connector;
a first connector for a wired connection;
an Ethernet connector;
a network processor;
a first signal path between the powerline connector and the network processor and including
a first coupler in communication with the powerline connector, and
a first low pass filter in communication between the first coupler and the network processor;
a second signal path between the first connector for the wired connection and the network processor and including
a second coupler in communication with the first connector for the wired connection, and
a first high pass filter in communication between the second coupler and the network processor and configured to pass a frequency band comprising frequencies at and above 30 MHz;
a third signal path between the first coupler and the network processor and including a second high pass filter in communication between the first coupler and the network processor; and
a host interface controller in communication between the Ethernet connector and the network processor.

2. The multi-network interface device of claim 1 wherein the network processor includes a high frequency analog front end and both the second and third signal paths include the high frequency analog front end.

3. A multi-network interface device comprising:
a powerline connector;
a first connector for a wired connection;
an Ethernet connector;
a network processor;
a first signal path between the powerline connector and the network processor and including
a first coupler in communication with the powerline connector, and
a first low pass filter in communication between the first coupler and the network processor;
a second signal path between the first connector for the wired connection and the network processor and including
a second coupler in communication with the first connector for the wired connection, and
a first high pass filter in communication between the second coupler and the network processor and configured to pass a frequency band comprising frequencies at and above 30 MHz;
a host interface controller in communication between the Ethernet connector and the network processor; and a second connector for a wired connection and a third signal path between the second connector for the wired connection and the network processor, the third signal path including a third coupler in communication with the second connector for the wired connection, and further including a second low pass filter in communication between the third coupler and the second connector for the wired connection.

4. The multi-network interface device of claim 3 wherein the third signal path also comprises the second coupler and the first high pass filter, wherein the second coupler is disposed between the third coupler and the first high pass filter.

5. A multi-network interface device comprising:
   a powerline connector;
   a first connector for a wired connection;
   an Ethernet connector;
   a network processor;
   a first signal path between the powerline connector and the network processor and including
      a first coupler in communication with the powerline connector, and
      a first low pass filter in communication between the first coupler and the network processor;
   a second signal path between the first connector for the wired connection and the network processor and including
      a second coupler in communication with the first connector for the wired connection, and
      a first high pass filter in communication between the second coupler and the network processor and configured to pass a frequency band comprising frequencies at and above 30 MHz; and
   a host interface controller in communication between the Ethernet connector and the network processor,
   wherein the second signal path comprises
      a receiving signal path including a low noise amplifier and a first band pass filter, and
      a transmitting signal path including a second band pass filter and a programmable amplifier.

6. The multi-network interface device of claim 5 wherein the receiving signal path further includes a down converter mixer and the transmitting signal path further includes an up converter mixer.

7. The multi-network interface device of claim 1 wherein the network processor is configured to communicate a first data signal over a powerline using a first frequency band via one of the first signal path and the third signal path and the powerline connector.

8. The multi-network interface device of claim 7 wherein the network processor is configured to communicate a second data signal over a telephone line or coaxial cable via the second signal path and the first connector.

9. The multi-network interface device of claim 8 wherein the powerline connector is configured to receive electrical power and the network processor, the first signal path, the second signal path, the third signal path, the host interface controller, the Ethernet connector and the first connector are configured to be powered by the electrical power received via the powerline connector.

10. The multi-network interface device of claim 8 wherein the network processor is further configured to communicate the second data signal over the powerline via the third signal path and the powerline connector while simultaneously communicating the first data signal over the powerline via the first signal path and the powerline connector.

11. The multi-network interface device of claim 10, wherein the second data signal is communicated using a high band wideband comprising, at least in part, frequencies between fifty megahertz and three hundred megahertz.

12. The multi-network interface device of claim 8 wherein the Ethernet connector is configured to communicate a third data signal to a network apparatus over an Ethernet connection.

13. The multi-network interface device of claim 12 wherein the network apparatus is selected from a group consisting of a personal computer, a television, a digital versatile disc player, a speaker, a stereo, a game console and a personal digital assistant.

14. The multi-network interface device of claim 1 wherein the network processor is configured to determine whether to, in the alternative, transmit a received data signal via the powerline connector or the first connector, based on a quality of service metric.

15. The multi-network interface device of claim 14 wherein the determination is based on a minimum bandwidth requirement associated with the received data signal.

16. The multi-network interface device of claim 1, wherein the first connector and the powerline connector are associated with a single media access control (MAC) address.

17. The multi-network interface device of claim 3 wherein the network processor is configured to communicate a first data signal over a powerline using a first frequency band via the first signal path and the powerline connector.

18. The multi-network interface device of claim 17 wherein the network processor is configured to communicate a second data signal over a telephone line or coaxial cable via one of a first combination of the second signal path and the first connector and a second combination of the third signal path and the second connector.

19. The multi-network interface device of claim 18 further comprising:
   a fourth signal path between the first coupler and the network processor and including a second high pass filter in communication between the first coupler and the network processor;
   wherein the network processor is further configured to communicate the second data signal over the powerline via the fourth signal path and the powerline connector while simultaneously communicating the first data signal over the powerline via the first signal path and the powerline connector.

20. The multi-network interface device of claim 19, wherein the second data signal is communicated over the fourth signal path and the second signal path using a high band wideband comprising, at least in part, frequencies between fifty megahertz and three hundred megahertz.

21. The multi-network interface device of claim 3 wherein the network processor is configured to determine whether to, in the alternative, transmit a received data signal via the powerline connector, the first connector or the second connector, based on a quality of service metric.

* * * * *